(12) United States Patent
Callaway et al.

(10) Patent No.: US 11,978,119 B1
(45) Date of Patent: *May 7, 2024

(54) MARKET OPERATION THROUGH REGULATION OF INCOMING ORDER MATCH ALLOCATION AND/OR DYNAMIC RESTING ORDER MATCH ALLOCATION PRIORITIES

(71) Applicant: Chicago Mercantile Exchange Inc., Chicago, IL (US)

(72) Inventors: Paul Callaway, Chicago, IL (US); Sean Castette, Chicago, IL (US); Kireeti Reddy, Chicago, IL (US); Akira Yamaguchi, Chicago, IL (US); José Antonio Acuña-Rohter, Des Plaines, IL (US); Pearce Peck-Walden, Chicago, IL (US); Zachary Bonig, Skokie, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,872

(22) Filed: Nov. 9, 2022

Related U.S. Application Data

(63) Continuation of application No. 14/644,460, filed on Mar. 11, 2015, now Pat. No. 11,544,785.
(Continued)

(51) Int. Cl.
 *G06Q 40/04* (2012.01)
(52) U.S. Cl.
 CPC .................. *G06Q 40/04* (2013.01)

(58) Field of Classification Search
 None
 See application file for complete search history.

(56) References Cited

U.S. PATENT DOCUMENTS 4,903,201 A * 2/1990 Wagner ................. G06Q 40/04
   705/37
5,136,501 A * 8/1992 Silverman ............. G06Q 40/04
   705/37

(Continued)

FOREIGN PATENT DOCUMENTS

ES 2754099 T3 4/2020

OTHER PUBLICATIONS

CME Group, "Matching Algorithms", Mar. 4, 2014, 7 pages.
(Continued)

*Primary Examiner* — Christopher Bridges
(74) *Attorney, Agent, or Firm* — Lempia Summerfield Katz LLC

(57) ABSTRACT

The disclosed embodiments relate to regulation of a rate of incoming orders by buffering or otherwise batching orders together as they are received and subsequently forwarding batches of orders to a match engine for processing thereby in a manner which may equalize orders from traders having varying abilities to rapid submit orders or otherwise capitalize on market events. The disclosed embodiments further relate to prioritizing the matching of resting orders against an incoming order. In particular, the disclosed embodiments alter the priority of a given resting order to match against an incoming order, relative to other suitably matching resting orders, as a function of how long the orders have been resting on the order book.

26 Claims, 10 Drawing Sheets

Related U.S. Application Data

(60) Provisional application No. 61/951,147, filed on Mar. 11, 2014.

(56) References Cited

U.S. PATENT DOCUMENTS

| | | | | |
|---|---|---|---|---|
| 6,385,198 | B1* | 5/2002 | Ofek | H04L 47/724 370/392 |
| 6,408,282 | B1* | 6/2002 | Buist | G06Q 40/04 705/36 R |
| 7,233,923 | B1* | 6/2007 | Wallace | G06Q 30/08 705/37 |
| 7,454,382 | B1* | 11/2008 | Triplett | G06Q 40/00 705/37 |
| 7,571,135 | B2* | 8/2009 | Burkhardt | G06Q 40/06 705/37 |
| 7,752,116 | B2* | 7/2010 | Ascher | G06Q 40/00 705/37 |
| 7,933,823 | B1* | 4/2011 | Seifert | H04L 12/1804 705/37 |
| 8,374,986 | B2* | 2/2013 | Indeck | G06F 16/24568 370/329 |
| 8,468,082 | B2* | 6/2013 | Doornebos | G06Q 40/04 709/236 |
| 8,688,566 | B2 | 4/2014 | Bartko et al. | |
| 8,868,461 | B2* | 10/2014 | Rotella | G06Q 40/04 705/37 |
| 10,140,156 | B2* | 11/2018 | Dantzig | G06F 9/5027 |
| 10,650,452 | B2* | 5/2020 | Parsons | G06Q 40/04 |
| 11,532,043 | B2* | 12/2022 | Callaway | G06Q 40/04 |
| 11,544,785 | B2* | 1/2023 | Callaway | G06Q 40/04 |
| 2004/0024691 | A1* | 2/2004 | Satow | G06Q 40/06 705/37 |
| 2004/0088242 | A1 | 5/2004 | Ascher et al. | |
| 2004/0193526 | A1* | 9/2004 | Singer | G06Q 20/102 705/37 |
| 2005/0125326 | A1* | 6/2005 | Nangalia | G06Q 40/04 705/37 |
| 2005/0171887 | A1* | 8/2005 | Daley | G06Q 40/04 705/37 |
| 2006/0015436 | A1 | 1/2006 | Burns et al. | |
| 2006/0047595 | A1* | 3/2006 | Bertilsson | H04L 67/1012 705/37 |
| 2006/0155635 | A1* | 7/2006 | Borro | G06Q 40/04 705/37 |
| 2006/0206407 | A1* | 9/2006 | Troxel, Jr. | G06Q 40/03 705/37 |
| 2007/0130048 | A1* | 6/2007 | Claus | G06Q 40/04 705/37 |
| 2008/0172318 | A1* | 7/2008 | Bartko | G06Q 40/04 705/37 |
| 2008/0243576 | A1* | 10/2008 | Czupek | G06Q 40/04 705/35 |
| 2009/0299914 | A1 | 12/2009 | Moran et al. | |
| 2010/0036763 | A1 | 2/2010 | Driscoll | |
| 2010/0088216 | A1 | 4/2010 | Czupek et al. | |
| 2010/0138334 | A1* | 6/2010 | Warsaw | G06Q 40/04 705/37 |
| 2011/0066568 | A1 | 3/2011 | Milne et al. | |
| 2012/0054084 | A1 | 3/2012 | Wolf et al. | |
| 2013/0018773 | A1 | 1/2013 | Edvardson | |
| 2014/0006243 | A1 | 1/2014 | Boudreault | |
| 2014/0067638 | A1* | 3/2014 | Tilfors | G06Q 40/04 705/37 |
| 2014/0101017 | A1 | 4/2014 | Mintz et al. | |
| 2015/0073970 | A1 | 3/2015 | Merold et al. | |
| 2019/0087898 | A1 | 3/2019 | Mannix | |

OTHER PUBLICATIONS

Eric Budish et al., "The High-Frequency Trading Arms Race: Frequent Batch Auctions as a Market Design Response", Dec. 23, 2013, 69 pages.

Eurex, "Matching Principles", Mar. 4, 2014, 3 pages, http://www.eurexchange.com/exchange-en/trading/market-model/matching-principles.

Extended European Search Report, from EP Application No. 15760854.8, dated Jul. 14, 2017, EP.

International Search Report and Written Opinion from, PCT/US2015/019851, dated Jun. 18, 2015, WO.

Karel Janecek et al., "Matching Algorithms of International Exchange", RSJ Invest a.s., Jan. 12, 2007, 21 pages, Prague.

Karel Janecek et al., "Matching Algorithms of International Exchanges", RSJ Invest a.s., Dec. 1, 2007, 12 pages.

Marco Pagano et al., "Auction and Dealership Markets", European Economic Review, 1992, pp. 613-623, vol. 36.

Robert Almgren et al., "Mixed FIFO/Pro Rata Match Algorithms", Quantitative Brokers, May 31, 2013, 6 pages.

United States Securities and Exchange Commission, "Initial Operation Report, Amendment to Initial Operation Report and Cessation of Operations Report for Alternative Trading System", Oct. 22, 2013, 36 pages.

Unknown, "Generalized Time Pro Rata Algorithm", Jan. 19, 2012, 2 pages.

\* cited by examiner

FIG. 7A

Decay Rule

| Age of the oldest resting order at X | % Quantity Resting Order at X |
|---|---|
| Less than 1 second old | 10 ms |
| Between 1 and 2 seconds old | 100 ms |
| Between 2 and 3 seconds old | 500 ms |
| Over 3 seconds old | 1000 ms |

Order Book

| Order | Arrival Time | Quantity |
|---|---|---|
| A | T + 10 ms | 100 |
| B | T + 50 ms | 400 |
| C | T + 200 ms | 500 |
| D | T + 800 ms | 1000 |

Common Assumptions

The order book is empty to begin.
At the times above in the "Order Book" table, orders arrive on one side of the market.
All orders have the same price.
At time (X) measured from initial time (T) an order arrives for a quantity of 100 that would match all resting orders.

|  | X = T + 1 second | X = T + 2 seconds | X = T + 3 seconds | X = T + 4 seconds |
|---|---|---|---|---|
| FIFO | [A]: 100<br>[B]: 0<br>[C]: 0<br>[D]: 0 | Same | Same | Same |
| Pro-Rata | [A]: 5<br>[B]: 20<br>[C]: 25<br>[D]: 50 | Same | Same | Same |
| Decay | [A]: 100<br>[B]: 0<br>[C]: 0<br>[D]: 0 | [A]: 20<br>[B]: 80<br>[C]: 0<br>[D]: 0 | [A]: 10<br>[B]: 40<br>[C]: 50<br>[D]: 0 | [A]: 5<br>[B]: 20<br>[C]: 25<br>[D]: 50 |

Notes:
Colors indicate the different priority evaluation tiers – in FIFO there is one tier for each order, in pro-rata all orders are in one tier.
FIFO always preserves time priority. Even when the both A and B are over 4 seconds old, the distinction is preserved despite them being only 10ms apart.
Pro-Rata ignores all time priority. D is a very late joiner to the price, but reaps the majority of the benefits.
The decay algorithm gracefully decays from FIFO to Pro-Rata, removing the benefits of time priority as the orders age.

FIG. 7B

| Decay Rule | Less than 1 second old | 10 ms |
| --- | --- | --- |
| | Between 1 and 1.5 seconds old | 250 ms |
| | Between 1.5 and 3 seconds old | 500 ms |
| | Over 3 seconds old | 1000 ms |

| Order Book | | |
| --- | --- | --- |
| A | T + 10 ms | 100 |
| B | T + 50 ms | 100 |
| C | T + 600 ms | 600 |
| D | T + 800 ms | 1200 |

Common Assumptions

The order book is empty to begin.
At the times above in the "Order Book" table, orders arrive on one side of the market.
All orders have the same price.
At time (X) measured from initial time (T) an order arrives for a quantity of 400 that would match all resting orders

| | X = T + 1 second | X = T + 2 seconds | X = T + 3 seconds | X = T + 4 seconds |
| --- | --- | --- | --- | --- |
| FIFO | [A]: 100<br>[B]: 100<br>[C]: 200<br>[D]: 0 | Same | Same | Same |
| Pro-Rata | [A]: 20<br>[B]: 20<br>[C]: 120<br>[D]: 240 | Same | Same | Same |
| Decay (re-eval after each batch) | Pass 1: Oldest order age 990 ms, A<br>[A]: 100<br>[B]: 0<br>[C]: 0<br>[D]: 0 | Pass 1: Oldest order age 1990 ms, A<br>[A]: 100<br>[B]: 100<br>[C]: 0<br>[D]: 0 | Pass 1: Oldest order age 2990 ms, A<br>[A]: 50<br>[B]: 50<br>[C]: 300<br>[D]: 0 | Pass 1: Oldest order age 3990 ms, A<br>[A]: 20<br>[B]: 20<br>[C]: 120<br>[D]: 240 |
| | | Pass 2: Oldest order age 950 ms, B<br>[B]: 100<br>[C]: 0<br>[D]: 0 | Pass 2: Oldest order age 1450 ms, C<br>[C]: 67<br>[D]: 133 | |
| | | | Pass 3: Oldest order age 400 ms, C<br>[C]: 200<br>[D]: 0 | |

Colors indicate the different priority evaluation tiers - in FIFO there is one tier for each order, in pro-rata all orders are in one tier.
FIFO always preserves time priority. Even when the both A and B are over 4 seconds old, the distinction is preserved despite them being only 10ms apart.
Pro-Rata ignores all time priority. D is a very late joiner to the price, but reaps the majority of the benefits.
The decay algorithm gracefully decays from FIFO to Pro-Rata, removing the benefits of time priority as the orders age.

| Decay Rule | | |
|---|---|---|
| | Less than 250 ms old | 10 ms |
| | Between 250 and 750 ms old | 100 ms |
| | Between 750ms and 950 ms old | 200 ms |
| | Over 950 ms old | 500 ms |

| Order Book | | | |
|---|---|---|---|
| | A | T + 0 ms | 200 |
| | B | T + 50 ms | 200 |
| | C | T + 800 ms | 400 |
| | D | T + 900 ms | 1200 |

Common Assumptions
The order book is empty to begin.
At the times above in the "Order Book" table, orders arrive on one side of the market.
All orders have the same price.
At time (X) measured from initial time (T) an order arrives for a quantity of 500 that would match all resting orders
Immediately after, a 100 lot order arrives that would match all resting orders

| X = T + 1 second | ORDER 1 | ORDER 2 | Total Allocation | Single Order? | Notes |
|---|---|---|---|---|---|
| FIFO | [A]: 200<br>[B]: 200<br>[C]: 100<br>[D]: 0 | [C]: 100<br>[D]: 0 | [A]: 200<br>[B]: 200<br>[C]: 200<br>[D]: 0 | [A]: 200<br>[B]: 200<br>[C]: 200<br>[D]: 0 | |
| Pro-Rata | [A]: 50<br>[B]: 50<br>[C]: 100<br>[D]: 300 | [A]: 10<br>[B]: 10<br>[C]: 20<br>[D]: 60 | [A]: 60<br>[B]: 60<br>[C]: 120<br>[D]: 360 | [A]: 60<br>[B]: 60<br>[C]: 120<br>[D]: 360 | |
| Decay based on oldest order | Oldest remaining order age 1000 ms (A)<br>Decay Rule 500 ms<br>[A]: 200<br>[B]: 200<br>[C]: 25<br>[D]: 75 | 200 ms (C)<br>10 ms<br>[C]: 100<br>[D]: 0 | [A]: 200<br>[B]: 200<br>[C]: 125<br>[D]: 75 | [A]: 200<br>[B]: 200 | In this case the removal of A and B from the book makes the most recent oldest order only 250 ms old - that drops the decay rule back to more FIFO, so even though C and D have already "shared priority" in the past they are now re-split. This is not ideal, mainly because the relative allocations to orders C,D can be affected by actions on orders A,B - namely their full fill or cancellation |
| Decay based on price level inception | Price level age 1000 ms (Entry of order A)<br>Decay Rule 500 ms<br>[A]: 200<br>[B]: 200<br>[C]: 25<br>[D]: 75 | 1000 ms (Entry of order A)<br>500 ms<br>[C]: 25<br>[D]: 75 | [A]: 200<br>[B]: 200<br>[C]: 50<br>[D]: 150 | [A]: 200<br>[B]: 200<br>[C]: 50<br>[D]: 150 | This is a more consistent approach. By using the "inception of the price level" (the entry of order A), no actions on orders A,B can change whether orders C,D are grouped together or not. This is also more in-line with the exchange goals, as the initial creation of the price level indicates how long it has been "low risk" to put an order of that price. Simply because order A and B are traded out, C should not suddenly be given time priority when they were a far distant 3rd order to be |

Notes:
Colors indicate the different priority evaluation tiers - in FIFO there is one tier for each order, in pro-rata all orders are in one tier.
FIFO always preserves time priority. Even when the both A and B are over 4 seconds old, the distinction is preserved despite them being only 10ns apart.
Pro-Rata ignores all time priority. D is a very late joiner to the price, but reaps the majority of the benefits.
The decay algorithm gracefully decays from FIFO to Pro-Rata, removing the benefits of time priority as the orders age.

Order Book

| Order | Arrival Time | Quantity |
|---|---|---|
| A | T + 1 ms | 50 |
| B | T + 2 ms | 50 |
| C | T + 200 ms | 100 |
| D | T + 201 ms | 1800 |
| E | T + 5000 ms | 8000 |

Common Assumptions

The order book is empty to begin.
At the times above in the "Order Book" table, orders arrive on one side of the market.
All orders have the same price.
At time (X) measured from initial time (T) an order arrives for a quantity of 200 that would match all resting orders

FIFO

[A]: 50
[B]: 50
[C]: 100
[D]: 0
[E]: 0

FIFO allocates fully to order C but not at all to order D, even though they were received at almost identical times and order D is for substantially more quantity

Pro-Rata

[A]: 1
[B]: 1
[C]: 2
[D]: 36
[E]: 160

Pro-Rata gives almost nothing to order A, the initial price turner. Order E, the late joiner is given the bulk of the allocation.

Split 25/75 FIFO Pro-rata

[A]: 50
[B]: 0
[C]: 1
[D]: 27
[E]: 122

25% of the incoming order is assigned FIFO - all of that goes to order A. Order B, received immediately after A, receives no allocation from FIFO. The remaining 75 percent is distributed pro-rata, which assuming this rounding convention (remaining quantity goes to largest order) completely shuts out order B from any allocation. Discontinuities of this nature can occur due to the splitting function and make allocation unpredictable: should order B have been received 1 millisecond before order A instead of 1 millisecond after it the allocations would have been reversed.

Decay (Mostly FIFO)
Always group orders by 10 ms

[A]: 50
[B]: 50
[C]: 5
[D]: 95
[E]: 0

A and B share FIFO priority and are fully filled. C and D are grouped together, and C gets the bulk of the allocation as it is much larger and received at approximately the same time. Late joiner E is shut out.

Decay (Mostly Pro-rata)
Always group orders by 1000 ms

[A]: 5
[B]: 5
[C]: 10
[D]: 180
[E]: 0

Late joiner E is shut out, but all other allocation is size based, with large order D receiving the bulk of the allocation.

Notes: Colors indicate the different priority evaluation tiers - in FIFO there is one tier for each order, in pro-rata all orders are in one tier.

MARKET OPERATION THROUGH REGULATION OF INCOMING ORDER MATCH ALLOCATION AND/OR DYNAMIC RESTING ORDER MATCH ALLOCATION PRIORITIES

REFERENCE TO RELATED APPLICATIONS

This application is a continuation under 37 C.F.R. § 1.53(b) of U.S. patent application Ser. No. 14/644,460 filed Mar. 11, 2015, now U.S. Pat. No. 11,544,785, which claims the benefit of the filing date under 35 U.S.C. § 119(e) of U.S. Provisional Application Ser. No. 61/951,147 filed Mar. 11, 2014, the entirety of all of which are hereby incorporated by reference herein and relied upon.

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

Typically, the Exchange provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces have largely supplanted the pit based trading systems whereby the traders, or their representatives, all physically stand in a designated location, i.e., a trading pit, and trade with each other via oral and hand based communication. In contrast to the pit based trading system where like-minded buyers and sellers can readily find each other to trade, electronic marketplaces must electronically "match" the orders placed by buyers and sellers on behalf thereof. Electronic trading systems may offer a more efficient and transparent system of trading. For example, in pit trading, subjective elements and limits on human interaction may influence the process by which buyers and sellers come together to trade or otherwise limit the trading opportunities, limiting market liquidity. In contrast, an electronic exchange may be more objective when matching up a buyer and seller, relying solely on objective factors such as price and time of order placement, etc. As such, electronic trading systems may achieve more fair and equitable matching among traders as well as identify more opportunities to trade, thereby improving market liquidity.

BRIEF DESCRIPTION OF THE DRAWINGS

FIGS. 7A-D depict exemplary order allocations according to the disclosed embodiments.

DETAILED DESCRIPTION

Figure 1:
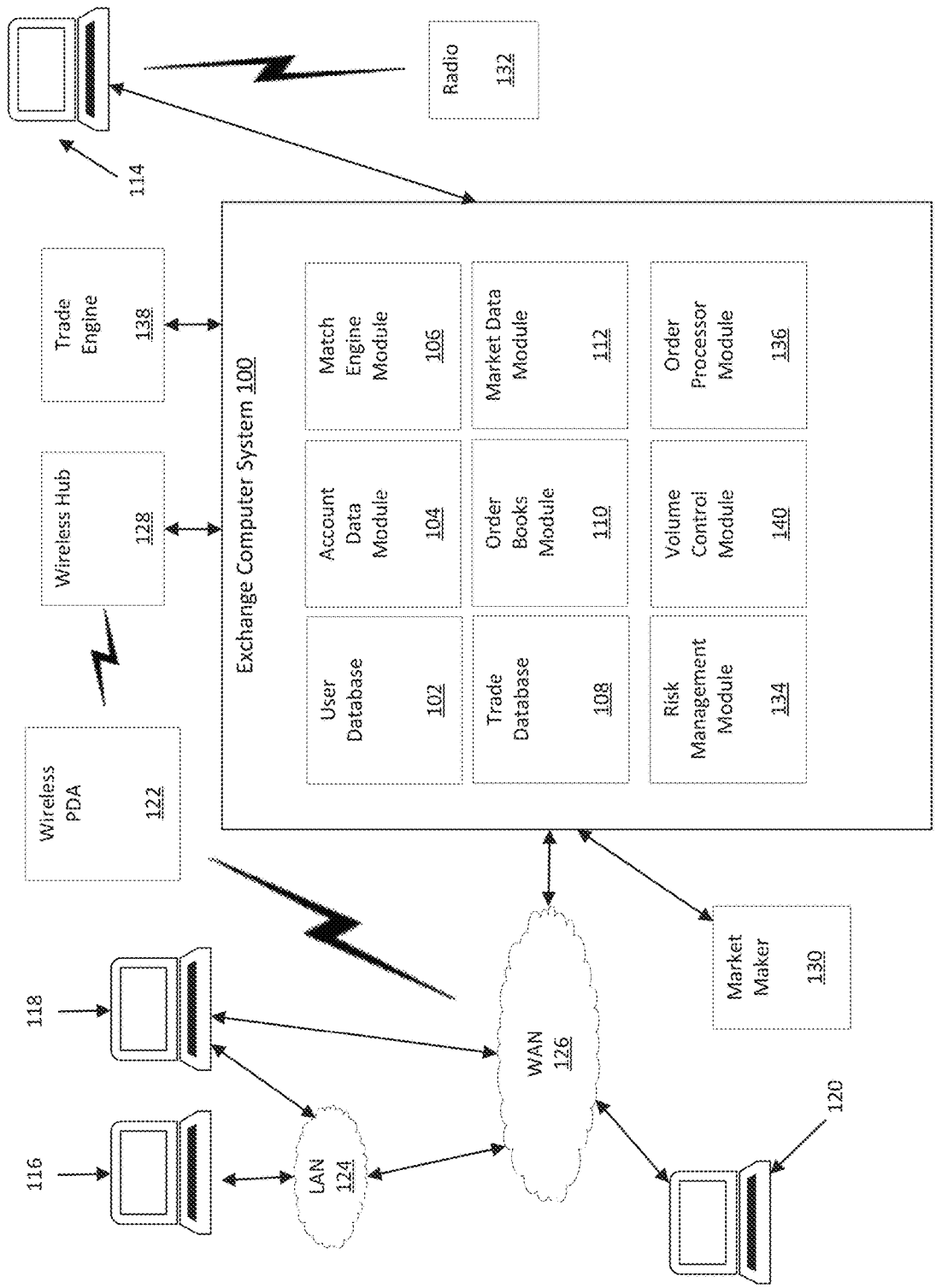
FIG. 1 depicts an illustrative computer network system that may be used to implement aspects of the disclosed embodiments.

The disclosed embodiments relate to systems and methods which match or otherwise allocate an incoming order to trade with "resting," i.e., previously received but not yet matched (fully satisfied), orders, recognizing that the algorithm or rules by which the incoming order is matched/allocated may affect the operation of the market for the financial product being traded. In particular, the disclosed embodiments relate to regulation of a rate of incoming orders by buffering or otherwise batching orders together as they are received and subsequently forwarding batches of orders to a match engine for processing thereby in a manner which may equalize orders from traders having varying abilities to rapidly submit orders or otherwise capitalize on market events. The disclosed embodiments further relate to prioritizing the matching of resting orders against an incoming order. In particular, the disclosed embodiments alter the priority of a given resting order to match against an incoming order, relative to other suitably matching resting orders, as a function of how long the orders have been resting on the order book.

While the disclosed embodiments may be discussed in relation to futures and/or options on futures trading, it will be appreciated that they may be applicable to any equity, options or futures trading system, e.g., exchange, Electronic Communication Network ("ECN"), Alternative Trading System ("ATS"), or Swap Execution Facility ("SEF"), or market now available or later developed, e.g. cash, Futures, etc., as well as any instrument traded thereon. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trade orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g., that transactional integrity and predictable system responses are maintained.

As was discussed above, electronic trading systems ideally attempt to offer an objective, efficient, fair and balanced market where market prices reflect a true consensus of the value of products traded among the market participants, where the intentional or unintentional influence of human interaction is minimized if not eliminated, and where unfair or inequitable advantages with respect to information access are minimized if not eliminated.

Further, as discussed above, an exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

Some products on an exchange are traded in an open outcry environment where the exchange provides a location for buyers and sellers to meet and negotiate a price for a quantity of a product. Other products are traded on an electronic trading platform (e.g., an electronic exchange), also referred to herein as a trading platform, electronic trading system, trading host or Exchange Computer System, where market participants, e.g., traders, use software to send orders to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

In particular, electronic trading of financial instruments, such as futures contracts, is conducted by market participants sending orders, such as to buy or sell one or more futures contracts, in electronic form to the Exchange. These electronically submitted orders to buy, and sell are then matched, if possible, by the Exchange, i.e., by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary embodiments, all transactions for a particular market may be ultimately received at the electronic trading system via one or more points of entry, e.g. one or more communications interfaces, at which the disclosed embodiments apply determinism, which as described may be at the point where matching occurs, e.g. at each match engine (where there may be multiple match engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. See U.S. patent application Ser. No. 14/074,675, filed on Nov. 7, 2013, published as U.S. Pat. No. 9,691,102, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a match engine, as will be described in detail below, will attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e. orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e., market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate among them, such as by picking the implied match comprising the least number of component financial instruments or the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g., counter to the desired order, being placed on the respective order books to rest (or give the appearance that there is an order resting) and presented via the market data feed to appear available to trade in order to solicit the desired orders from the market participants. Depending on the number component financial instruments involved, and whether those component financial instruments further comprise component financial instruments of their own, there may be numerous implied opportunities, the submission thereof, would allow the incoming order to be at least partially matched.

Implied opportunities, e.g., the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Exchange Computer System, as will be described below, monitors incoming orders received thereby and attempts to identify, i.e., match or allocate, as will be described in more detail below, one or more previously received, but not yet matched, orders, i.e. limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the Exchange Computer System identifies that an incoming market order may be filled by a combination of multiple resting orders, e.g. the resting order at the best price does only partially fills the incoming order, the Exchange Computer System may allocate the remaining quantity of the incoming, i.e. that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the Exchange for multiple financial products. Similarly, if the Exchange Computer System identifies multiple orders contra to the incoming limit order and that have an identical price which is favorable to the price of the incoming order, i.e. the price is equal to or better, e.g. lower if the incoming order is a buy or higher if the incoming order is a sell, than the price of the incoming order, the Exchange Computer System may allocate the quantity of the incoming order among such identified orders in accordance with the matching algorithms as, for example, may be defined in the specification of the particular financial product or defined by the Exchange for multiple financial products.

As was noted above, an Exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g. unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some Exchange Computer Systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some Exchange Computer Systems cap the quantity of an incoming order that is allocated to a standing order on the basis of a priority for certain markets. In addition, some Exchange Computer Systems may give a preference to orders submitted by a trader who is designated as a market maker for the product. Other Exchange Computer Systems may use other criteria to determine whether orders submitted by a particular trader are given a preference. Typically, when the Exchange Computer System allocates a quantity of an incoming order to a plurality of identified orders at the same price, the trading host allocates a quantity of the incoming order to any orders that have been given priority. The Exchange Computer System thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein.

Other examples of matching algorithms which may be defined for allocation of orders of a particular financial product include:
Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:
Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:
1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

(Order volume/Matching volume)*Tradable volume

The result is rounded down(for example, 21.99999999becomes 21)unless the result is less than 1,when it becomes 1.
7. If tradable volume remains when the last order in the list had been allocated to, return to step 3.
Note: The matching list is not re-sorted, even though the volume has changed. The order which originally had the largest volume is still at the beginning of the list.
8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:
1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot(for example,21.99999999becomes 21)unless the result is less than the defined threshold in which case it is rounded down to 0.
7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99 (a percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:
1. Priority order. if applicable
2. Preference allocation, if applicable
3. Price Time allocation of the configured percentage of incoming volume
4. Threshold Pro-Rata allocation of any remaining incoming volume
5. Final allocation of any leftover lots in time sequence. Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein.

One exemplary system for matching is described in U.S. patent application Ser. No. 13/534,499, filed on Jun. 27, 2012, entitled "MULTIPLE TRADE MATCHING ALGORITHMS," published as U.S. Patent Application Publication No. 2014/0006243 A1, incorporated by reference herein, discloses an adaptive match engine which draws upon different matching algorithms, e.g. the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

In one implementation, this trading system may evaluate market conditions on a daily basis and based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the Exchange.

The disclosed embodiments directed to incoming order regulation attempt to equalize the rate at which incoming orders are processed upon receipt to, for example, reduce, but not eliminate, the impact of speed. Incoming orders, once equalized, are then allocated for matching in a manner which may incentivize desired behavior. The disclosed embodiments may incentivize market making behavior over aggressor behavior to improve and maintain market liquidity or health by, for example, reducing penalties for risk taking behavior, and incentivizing submission of orders which reflect the true intent of the market participant, or at least a close approximation thereof, even if that intent is to leverage anomalies or inefficiencies in the operations of market or the electronic trading system. Furthermore, by reducing the incentive to invest in faster trading systems, the cost of which may exponentially increase with respect to linear improvements, market participants can devote more capital to investment and market participation. In addition, by not eliminating the benefit of speed altogether, speedy order submission may be rewarded where it improves market liquidity/health.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, Exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata. The hybrid system discussed above switches between FIFO and pro rata based on a condition of the market.

The disclosed embodiments relate to a hybrid matching/allocation algorithm which recognizes that, for example, the befit of time priority to the market decays or otherwise degrades over time, rather than simply based on the occurrence of an event, and, thus, implement a gradual time based shift from a FIFO allocation method toward a hybrid FIFO/pro rata allocation methodology and, in one alternative embodiment, ultimately to a fully pro rata allocation method on an order by order basis. In this exemplary embodiment, upon receipt of a resting order, it may be accorded FIFO priority with respect to a subsequently received suitably matching incoming order. However, until a matching incoming order is received, as that order, along with other suitably matching resting order received subsequent thereto, age, they may be grouped or otherwise clustered together, such as based on their temporal proximity to each other. Each group may maintain a FIFO priority over other groups but within each group, an incoming order will be allocated pro rata. This gradual decay rewards first in time in a fast moving market but reduces/removes that benefit in a slower moving market.

Figure 4:
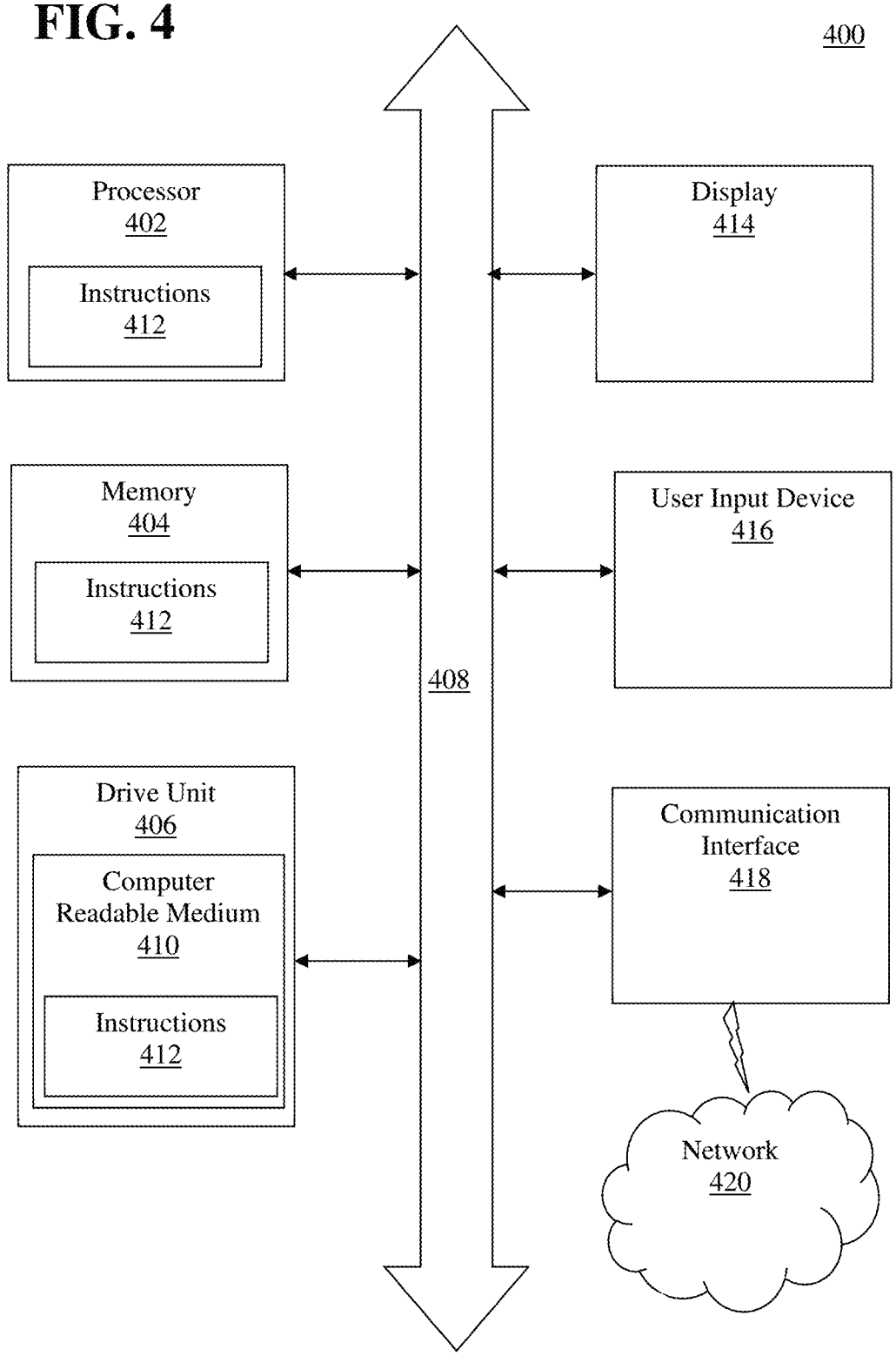
FIG. 4 shows an illustrative embodiment of a general computer system for use with the system of FIGS. 1-3.

The disclosed embodiments are preferably implemented with computer devices and computer networks, such as those described with respect FIG. 4, that allow users, e.g., market participants or traders, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An electronic trading system 100, referred also to as the "exchange" or "exchange computer system," receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The electronic trading system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers as will be described in more detail below with respect to FIG. 2. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It will be appreciated that the types of computer devices deployed by traders and the methods and media by which they communicate with the electronic trading system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to electronic trading system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the electronic trading system 100, such as via one of the exemplary computer devices depicted. The electronic trading system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to electronic trading system 100. In another example, the exemplary computer device 118 may include computer-executable instructions for receiving market data from electronic trading system 100 and displaying that information to a user.

Of course, numerous additional servers, computers, handheld devices, personal digital assistants, telephones and other devices may also be connected to the electronic trading system 100. Moreover, one skilled in the art will appreciate that the topology shown in FIG. 1 is merely an example and that the components shown in FIG. 1 may include other components not shown and be connected by numerous alternative topologies.

Figure 2:
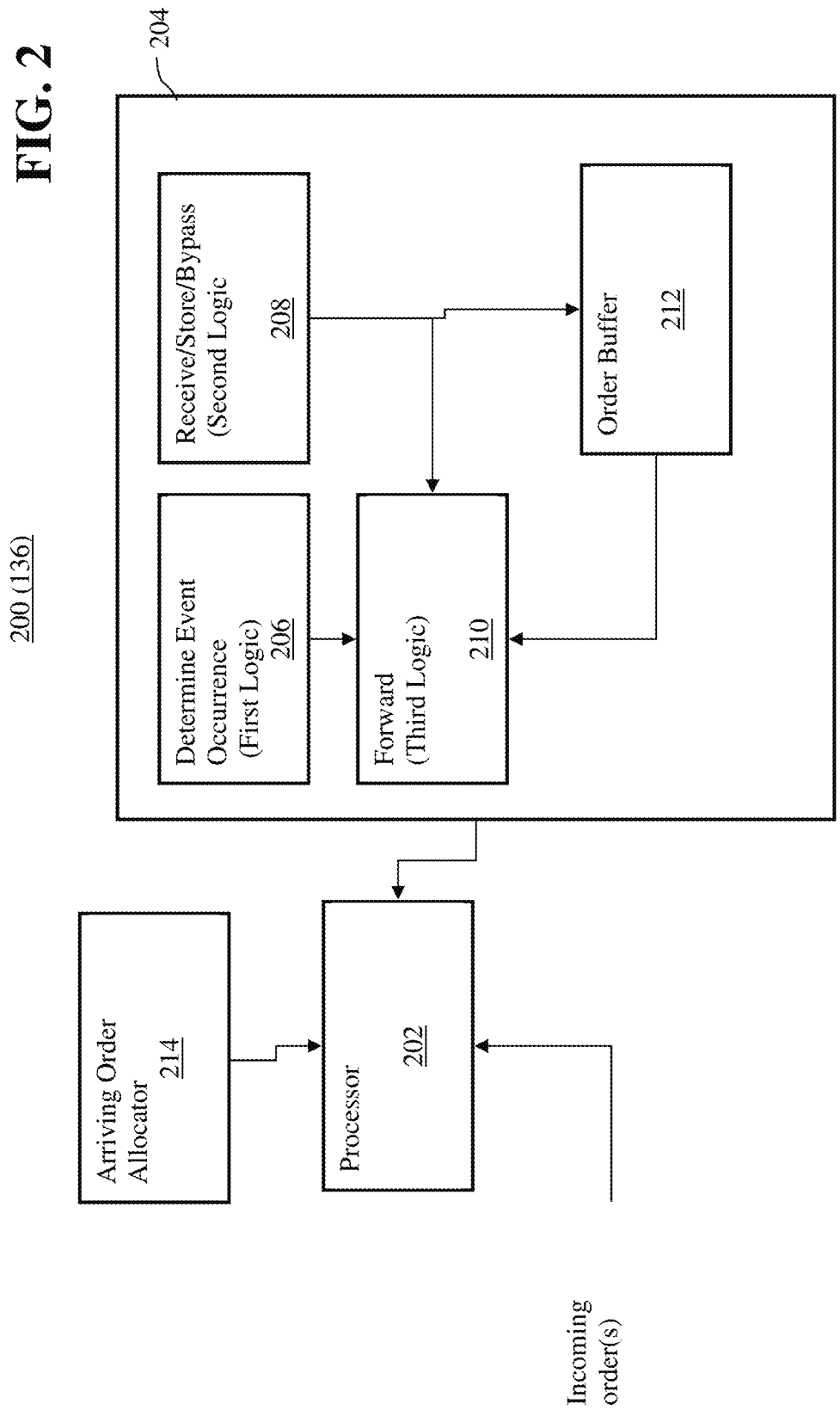
FIG. 2 depicts a block diagram of an exemplary implementation of the system of FIG. 1 for regulating incoming order.

FIG. 2 depicts a block diagram of an order processor module 136 according to one embodiment, which in an exemplary implementation, is implemented as part of the exchange computer system 100 described above. As used herein, an electronic trading system 100, i.e., exchange, includes a place or system that receives and/or executes orders. It will be appreciated that the disclosed embodiments may be implemented by or in conjunction with other modules or components of the electronic trading. While the disclosed embodiments will be described with respect to a separate implementation for each match engine, market or order book, it will be appreciated that the disclosed embodiments may also be implemented across the entire electronic trading system 100 such as for example, by further denoting incoming orders by their intended market and separately processing orders received for a given market as described herein.

In particular, FIG. 2 depicts a block diagram of a system 200, which may also be referred to as an architecture, for regulating incoming order allocation in an electronic trading system 100, such as incoming orders to trade a financial product, received via a network, such as the network 126 of FIG. 1, from a plurality of market participants. Wherein, as described, the electronic trading system 100 comprising a match engine 106 which implements a market for an associated financial instrument by being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order.

The system 200 includes an interval processor 206, which may be implemented as a separate component or as one or more logic components, such as on an FPGA which may include a memory or reconfigurable component to store logic and processing component to execute the stored logic, or as first logic 206, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, determine an occurrence of an event.

The system 200 further includes an incoming order receiver 208, which may be implemented as a separate component or as one or more logic components, such as on an FPGA which may include a memory or reconfigurable component to store logic and processing component to execute the stored logic, or as second logic 208, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, receive an incoming order and store, or otherwise collect, aggregate, buffer or batch, the received incoming order in a memory 212/204 coupled with the order receiver 208, such as an incoming order buffer 212, which may be a part of the memory 204 or separate therefrom.

The system 200 further includes an order forwarder 210, coupled with the memory 212/204, the order receiver 208 and the interval processor 206, and which may be implemented as a separate component or as one or more logic components, such as on an FPGA which may include a memory or reconfigurable component to store logic and processing component to execute the stored logic, or as third logic 210, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, upon the occurrence of the event, forward at least a subset of the stored received incoming orders to the match engine 106.

In effect, the disclosed embodiments may align or otherwise normalize incoming orders, or the rate of receipt thereof, to the occurrence of an event, which as described below, may be a time interval. This may result in the equalization of the value, e.g., as being earlier, of each order or otherwise alter their relative value. By configuring the event as the expiration of a fixed or variable time interval, to a system event such an indication of available or over capacity or other feedback signal, or to the receipt of an incoming order, or combinations thereof, incoming orders, or the rate of receipt thereof, may be aligned to a common rate/clock, the electronic trading system's 100 capacity to process orders, and/or relative to other orders, such as to equalize orders submitted by automated and/or algorithmic traders with order submitted by traders who are less fast. Once grouped, buffered or otherwise batched, the event, which may be the next clock edge, a signal from the match engine 106, or some other indicator, causes all of the stored orders to be sent to the match engine 106 for matching. As will be described, the match engine 106 may then decide how to process the orders out of each batch.

As an example, the following orders may be received (with their time of receipt in parentheses): A(1 ms), B(2 ms), C(10 ms) D(14 ms), E(16 ms), F(22 ms). Where the event is the expiration of a clock having a 5 ms period, the orders would be batched as follows: AB, CDE, F.

In one embodiment, the incoming order receiver 208 is further operative to receive the incoming order when the incoming order's arrival relative to another incoming order has been determined, e.g., at the match engine 106 or otherwise at the point of incoming order ingress or other point of determinism as was described above. Incoming order receiver may preserve or otherwise store data indicative of the order of arrival with each incoming order. In one embodiment, the interval processor 206, incoming order receiver 208 and order forwarder 210 are comprised by the match engine 106.

In one embodiment, each order is characterized by any of a set of order types, the order forwarder being further operative to forward or otherwise bypass the incoming order to the match engine upon receipt thereof when the order type thereof is one of a subset of the set of order types. For example, in one embodiment, the subset of order types includes at least one of administrative message, control message, cancel message, order modification message, or combinations thereof. Order modification messages may include messages which alter an order that was earlier received but not yet matched or a resting order, e.g., modifies the resting quantity. This may permit the match engine act on cancel or modify messages, for example, in advance of other messages, such as orders which would have matched against the order to be canceled. It will be appreciated that whether cancel or modify messages are processed first or last, or otherwise in order of receipt, is implementation dependent and may depend on business and/or regulatory rules defining how and when a trader may cancel an order. As an alternative to bypassing orders around the batching mechanism, these order types may be flagged to be allocated first or last out of the batch when the batch of orders is forwarded to the match engine. In an implementation designed, at least in part, to regulate incoming order flow relative to the capacity of the system, e.g., where the event which triggers forwarding is based on a signal indicative of processing capacity, this would allow the match engine 106 process such messages according to its processing capacity.

In one embodiment, the event comprises an elapse of an interval or window of time and may be defined by when the window opens and the duration thereof. In one embodiment, the event may be caused by a continually rolling clock, e.g., a gating clock, where each clock edge is an event which defines/separates a batch of orders.

In one embodiment, the time interval begins to elapse upon receipt of an incoming order, e.g., a batchable order (one that, for example, would not be bypassed as described herein), subsequent to a prior elapse of the time interval. As described above, this may permit regulation of incoming orders relative to each other by triggering the buffering upon receipt of a first order, after a prior batch has been forwarded, and buffering for a duration of time or until a subsequent event occurs as described herein.

In one embodiment, the duration of the time interval is fixed. Alternatively, in one embodiment, the duration of the time interval is variable and may vary at least partially, i.e., pseudo, or fully/truly randomly and/or based on a condition of the market for the associated financial instrument, such as market volatility, order volume, order velocity, or combinations thereof, or other feedback loop/signal indicative of market conditions and/or system capacity. In one embodiment, the duration of the time interval may be altered periodically. It will be appreciated that a variable time interval may be harder to predict by market participants looking to advantageously time the submission of their orders with respect thereto. However, it may be expected that market participants will always want to be the earliest order among any given batch of incoming orders, in particular for example, if, as in one exemplary embodiment, the resulting allocation out of the batch preferences orders at the start of the batch.

In one embodiment, the event may be the receipt of an acknowledgment from the match engine acknowledging receipt of previously forwarded incoming orders. As described above, this may be used to regulate order flow based on processing resource capacity.

In one embodiment, the event may be the number of stored received incoming orders exceeds a threshold. For example, the number of orders allowed to be batched in any one batch may be limited. Such an order limit may be utilized in conjunction with the other implementations described herein, such as a time interval, to cap the number of orders that may be stored prior to forwarding. In a fast moving market, where the rate of order submission is high, this may prevent the buffer memory from being overflowed or otherwise batching together more orders than the match engine 106 can effectively handle. In an alternative embodiment, threshold number of orders may be a minimum wherein incoming orders are batched until a minimum number of orders have been received before forwarding. This embodiment may be further combined with a time duration so as to not overly delay processing of orders, such as in a slow moving market where order submissions are less frequent.

In one embodiment, the received incoming orders are stored in the memory in association with data indicative of time and/or order of receipt by the order receiver. For example, this data may be utilized by the match engine 106 to allocate orders out of the batch when performing the matching process.

In one embodiment, an incoming order stored in the buffer memory 212 may be held back and not forwarded with the batch of orders it is stored with. For example, a trader may be permitted to subsequently send a hold message or some other indication that they may wish to delay their prior order. Incoming orders may be held when the electronic trading system 100, via a system, not shown, which evaluates orders for compliance with business and/or regulatory rules, determines that an incoming order is suspicious or otherwise anomalous and should be delayed pending further review. In another example, incoming orders determined to exacerbate a highly volatile market may be delayed in order to prevent or mitigate a market crash or other undesirable market event.

In one embodiment, the order forwarder 210 may be further operative to allow a subsequently received incoming transaction/order to modify or cancel a stored received incoming order prior to a forwarding thereof to the match engine. By, for example, allowing orders to be canceled or modified prior to forwarding, the processing demands on the match engine 106 may be reduced.

Once a batch of incoming orders has been forwarded to the match engine 106, the match engine 106 must determine the order/sequence in which those orders within a batch will be processed against the resting orders of the order book. In one embodiment, the match engine 106 is further operative to determine a sequence in which the match engine 106 will attempt to match each of the forwarded subset of the received incoming orders. In one implementation, the match engine 106 may include an arriving order allocator 214, which may be implemented as a separate component or as one or more logic components, such as on an FPGA which may include a memory or reconfigurable component to store logic and processing component to execute the stored logic, or as logic, e.g. computer program logic, stored in a memory (not shown), or other non-transitory computer readable medium, and executable by a processor (not shown), such as the processor 402 and memory 404 described below with respect to FIG. 4, to cause the processor 202 to, or otherwise be operative to, determine a sequence in which the match engine 106 will attempt to match each of the forwarded subset of the received incoming orders. While the arriving order allocator 214 is described herein as part of the match engine 106, it will be appreciated that it may be separate therefrom and may be part of the system 200 or implemented between the system 200 and the match engine 106.

Generally, the sequence may be determined based on order of arrival, as a function of order of arrival or without regard to order of arrival. Further, the allocation methodology may be different for different markets and may vary within a market or otherwise be fixed. It will be appreciated that the selection of the allocation methodology will be based on the degree to which it is desirable to flatten out or remove the benefit of speed of order submission, e.g., the benefit of being first. As will be seen, orders may be allocated all at once, subject to preferenced orders being processed first, or orders may be processed by order type or classification of orders and then within each classification, those orders may be processed by time, randomly or via some other allocation methodology as will be described.

In on embodiment, the allocation methodology may determine the sequence to be at least partially, e.g., pseudo, or fully/truly random, e.g., orders are randomly selected out of the batch to be processed, subject to constraints such as order of arrival among orders of the same market participant as described below. In one embodiment, the determination of the sequence may weight the chance of random selection each of the subset of the received incoming orders by an associated time of arrival, which may be referred to as Lottery-Time. Alternatively, the determination of the sequence may weight the chance of selection of each of the subset of the received incoming orders by an ordinal position, i.e., an order of receipt by the incoming order receiver relative to the others of the subset of the received incoming orders, which may be referred to as Lottery-Position.

In on embodiment, the allocation methodology may determine the sequence to be first-in-first-out ("FIFO"), e.g., in order of an associated time of arrival of each of the subset of the received incoming orders at the incoming order receiver. As was described above, this may be used in an implementation which regulates incoming order flow relative to the processing capacity of the electronic trading system 100.

In one embodiment, the allocation methodology may determine the sequence to be that all orders of the forwarded subset of the received incoming orders are processed concurrently such as a proportional allocation, e.g., pro-rata, or via an auction/micro-auction (matched by price-time-priority). With respect to a proportional allocation, such as a pro-rata allocation, when the two or more incoming orders of a batch may be for a total quantity greater than a total quantity of suitable counter orders currently resting on the order book, each of the incoming orders may be allocated pro rata share of the resting quantity with any residual unsatisfied quantity of those incoming orders then being rested on the order book. In one embodiment, time of arrival for orders determined to share a proportional allocation may be used to skew that allocation, such as to provide a bigger allocation to earlier arriving orders. It will be appreciated that, with respect to allocation of a lesser available resting quantity to a greater desired quantity of the incoming orders, any of the allocation methodologies described herein, including the decay methodology described below, for allocating a lesser quantity of the incoming orders to a greater available quantity of the resting orders may be applied. Accordingly, when orders are taken out of a batch and exposed to the order book, they need not be filled in full, as long as the order book isn't crossed, i.e., when a bid order exists on the order book at a price less than an ask order on the order book at a lower price, after all orders are exposed to the book.

In one embodiment, incoming orders may be allocated out of a batch of orders based on price level such that orders with a better price are sent to the match engine first.

In one embodiment, wherein an incoming order may further comprise a request to modify or cancel a previously forwarded received incoming order for a transaction of the associated financial instrument, the match engine 106 or arriving order allocator 214 may be further operative to process the request to modify or cancel ahead of or after processing the others of the forward subset of received incoming orders. Processing cancels first, as was described above, may allow a trader to cancel an order before another trader can capitalize on it. Processing cancels last may promote increased trading volume.

In one embodiment, incoming orders within a batch of orders may be analyzed to determine if multiple orders from the same market participant are in the same batch. In this case, the disclosed embodiments may process those orders from the same market participant in the order or receipt to forward to the match engine. For example, when using a random or pseudo random allocation out of each batch, the disclosed embodiments may implement the random selection based on the identity of the market participant and then, where multiple incoming orders from that market participant exist in the batch of incoming orders, those orders will be allocated in order of receipt. Alternatively, when multiple incoming orders are detected from the same market participant, random selection of one of those orders for allocation may be subject to an order of arrival priority.

In one embodiment, the match engine 106 or arriving order allocator 214 may be further operative to detect when two or more of the forwarded subset of received incoming orders are counter to each other and have been submitted by a single trading entity and prevent those two or more orders from matching to each other. Such "self trading" detection may be implemented in accordance with business and/or regulatory rules implemented by the electronic trading system 100. It will be appreciated that, in one alternative embodiment, the match engine 106 may attempt to identify suitable counter orders from other traders so as to complete the transactions, if possible, for all of the participants.

Figure 3:
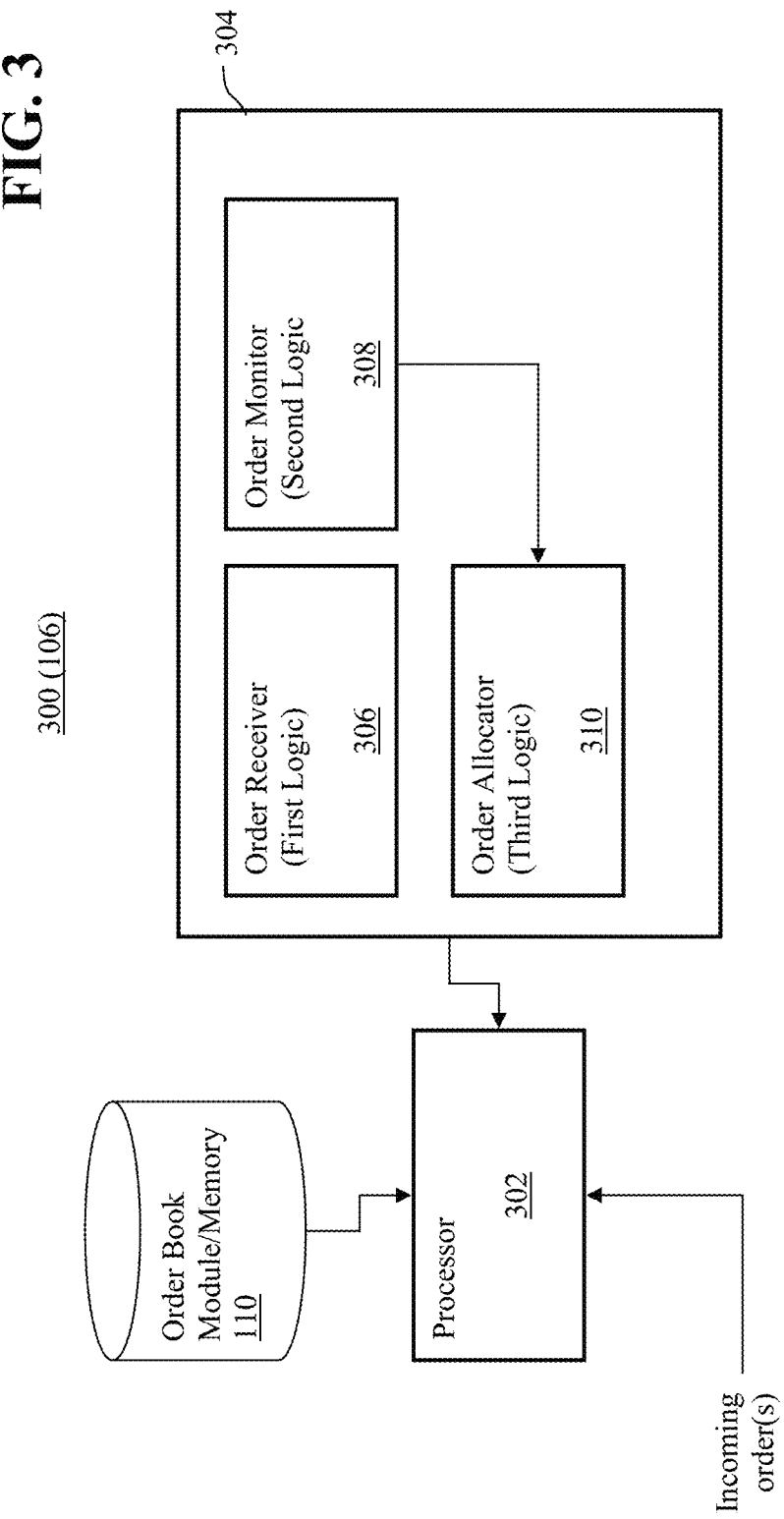
FIG. 3 depicts a block diagram of an exemplary implementation of the system of FIG. 1 for prioritizing allocation of incoming orders to resting orders.
Figure 5:
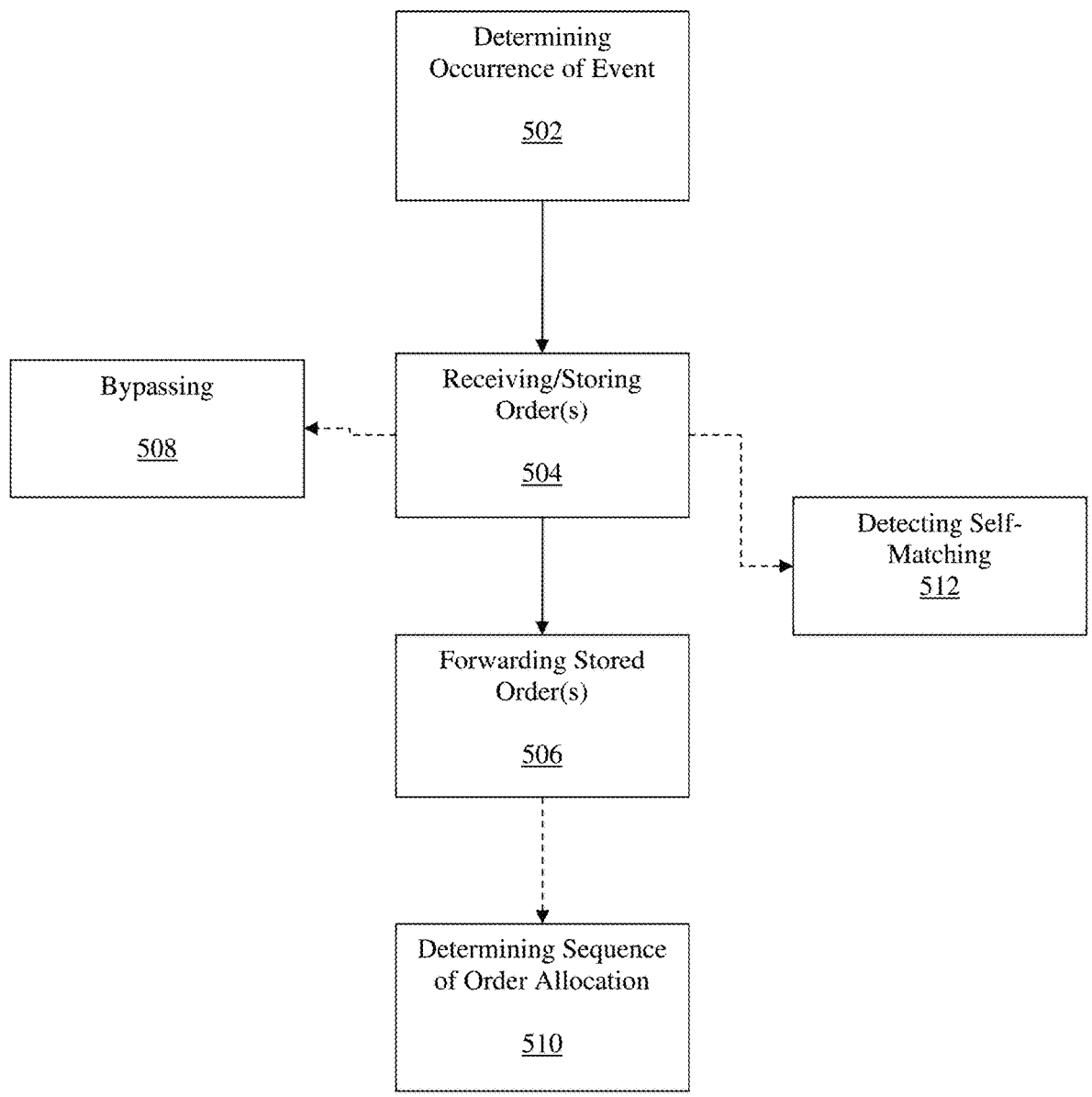
FIG. 5 depicts a flow chart showing operation of the system of FIGS. 1 and 2.

FIG. 5 depicts a flow chart showing operation of the system 200 of FIG. 2. In particular FIG. 3 shows a computer implemented method of regulating incoming order allocation in an electronic trading system 100, the electronic trading system 100 comprising a match engine 106 which implements a market for an associated financial instrument by being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order.

The operation of the system 200 includes: determining, by an incoming order processor 202, an occurrence of an event [Block 502]; receiving, by the incoming order processor 202, an incoming order and storing the received incoming order in a memory 204/212 coupled with the incoming order processor [Block 504]; and forwarding by the incoming order processor 202, upon the occurrence of the event, at least a subset of the stored received incoming orders to the match engine 106 [Block 506].

In effect, the disclosed embodiments may align or otherwise normalize incoming orders, or the rate of receipt thereof, to the occurrence of an event, which as described below, may be a time interval. This may result in the equalization of the value, e.g., as being earlier, of each order or otherwise alter their relative value. By configuring the event as the expiration of a fixed or variable time interval, to a system event such an indication of available or over capacity or other feedback signal, or to the receipt of an incoming order, or combinations thereof, incoming orders, or the rate of receipt thereof, may be aligned to a common rate/clock, the electronic trading system's 100 capacity to process orders, and/or relative to other orders, such as to equalize orders submitted by automated and/or algorithmic speed traders with order submitted by traders who are less fast. Once grouped, buffered or otherwise batched, the event, which may be the next clock edge, a signal from the match engine 106, or some other indicator, causes all of the stored orders to be sent to the match engine 106 for matching. As will be described, the match engine 106 may then decide how to process the orders out of each batch.

As an example, the following orders may be received (with their time of receipt in parentheses): A(1 ms), B(2 ms), C(10 ms) D(14 ms), E(16 ms), F(22 ms). Where the event is the expiration of a clock having a 5 ms period, the orders would be batched as follows: AB, CDE, F.

In one embodiment, the receiving, by the incoming order processor 202, further includes receiving the incoming order when the incoming order's arrival relative to another incoming order has been determined, e.g., at the match engine 106 or otherwise at the point of incoming order ingress or other point of determinism as was described above. In one embodiment, the determining, receiving and forwarding are performed by the match engine 106.

In one embodiment, the duration of the time interval is fixed. Alternatively, in one embodiment, the duration of the time interval is variable and may vary at least partially, i.e., pseudo, or fully/truly randomly and/or based on a condition of the market for the associated financial instrument, such as market volatility, order volume, order velocity, or combinations thereof, or other feedback loop/signal indicative of market conditions and/or system capacity. In one embodiment, the duration of the time interval may be altered periodically. It will be appreciated that a variable time interval may be harder to predict by market participants looking to advantageously time the submission of their orders with respect thereto. However, it may be expected that market participants will always want to be the earliest order among any given batch of incoming orders.

In one embodiment, the event may be the receipt of an acknowledgment from the match engine acknowledging receipt of previously forwarded incoming orders. As described above, this may be used to regulate order flow based on processing resource capacity.

In one embodiment, the event may be the number of stored received incoming orders exceeds a threshold. For example, the number of orders allowed to be batched in any one batch may be limited. Such an order limit may be utilized in conjunction with the other implementations described herein, such as a time interval, to cap the number of orders that may be stored prior to forwarding. In a fast moving market, where the rate of order submission is high, this may prevent the buffer memory from being overflowed or otherwise batching together more orders than the match engine 106 can effectively handle. In an alternative embodiment, threshold number of orders may be a minimum wherein incoming orders are batched until a minimum number of orders have been received before forwarding. This embodiment may be further combined with a time duration so as to not overly delay processing of orders, such as in a slow moving market where order submissions are less frequent.

In one embodiment, the received incoming orders are stored in the memory in association with data indicative of time and/or order of receipt by the order receiver. For example, this data may be utilized by the match engine 106 to allocate orders out of the batch when performing the matching process.

In one embodiment, an incoming order stored in the buffer memory 212 may be held back and not forwarded with the batch of orders it is stored with. For example, a trader may be permitted to subsequently send a hold message or some other indication that they may wish to delay their prior order. Incoming orders may be held when the electronic trading system 100, via a system, not shown, which evaluates orders for compliance with business and/or regulatory rules, determines that an incoming order is suspicious or otherwise anomalous and should be delayed pending further review. In another example, incoming orders determined to exacerbate a highly volatile market may be delayed in order to prevent or mitigate a market crash or other undesirable market event.

In one embodiment, the operation of the system 200 further includes allowing a subsequently received incoming order to modify or cancel a stored received incoming order prior to a forwarding thereof to the match engine [Block 508]. By, for example, allowing orders to be canceled or modified prior to forwarding, the processing demands on the match engine 106 may be reduced.

In one embodiment, the operation of the system 200 further includes determining a sequence in which the match engine 106 will attempt to match each of the forwarded subset of the received incoming orders [Block 510].

Generally, the sequence may be determined based on order of arrival, as a function of order of arrival or without regard to order of arrival. Further, the allocation methodology may be different for different markets and may vary within a market or otherwise be fixed. It will be appreciated that the selection of the allocation methodology will be based on the degree to which it is desirable to flatten out or remove the benefit of speed of order submission, e.g., the benefit of being first. As will be seen, orders may be allocated all at once, subject to preferred orders being processed first, or orders may be processed by order type or classification of orders and then within each classification, those orders may be processed by time, randomly or via some other allocation methodology as will be described.

In on embodiment, the allocation methodology may determine the sequence to be at least partially, e.g., pseudo, or fully/truly random, e.g., orders are randomly selected out of the batch to be processed subject to, for example, constraints such as order of arrival for orders received from the same market participant. In one embodiment, the determination of the sequence may weight the chance of random selection each of the subset of the received incoming orders by an associated time of arrival, which may be referred to as Lottery-Time. Alternatively, the determination of the sequence may weight the chance of selection of each of the subset of the received incoming orders by an ordinal position, i.e., an order of receipt by the incoming order receiver relative to the others of the subset of the received incoming orders, which may be referred to as Lottery-Position.

In on embodiment, the allocation methodology may determine the sequence to be first-in-first-out ("FIFO"), e.g., in order of an associated time of arrival of each of the subset of the received incoming orders at the incoming order receiver. As was described above, this may be used in an implementation which regulates incoming order flow relative to the processing capacity of the electronic trading system 100.

In on embodiment, the allocation methodology may determine the sequence to be that all orders of the forwarded subset of the received incoming orders are processed concurrently such as a proportion allocation, e.g., pro-rata, or via a micro-auction (matched by price-time-priority), factoring in or otherwise ignoring time of arrival. As described above, any allocation methodology described herein with respect to allocating a lesser total incoming order quantity to a greater total resting quantity, including the decay methodology described below, may be used herein for the purpose of allocating a greater total incoming order quantity to a lesser total resting order quantity. Alternatively, or in addition thereto, the sequence of processing orders may be by price level such that orders at better prices are matched first.

In one embodiment, wherein an incoming order may further comprise a request to modify or cancel a previously forwarded received incoming order for a transaction of the associated financial instrument, the match engine 106 or arriving order allocator 214 may be further operative to process the request to modify or cancel ahead of or after processing the others of the forward subset of received incoming orders. Processing cancels first, as was described above, may allow a trader to cancel an order before another trader can capitalize on it. Processing cancels last may increase trading volume.

In one embodiment, the operation of the system 200 further includes detecting when two or more of the forwarded subset of received incoming orders are counter to each other and have been submitted by a single trading entity and prevent those two or more orders from matching to each other [Block 512]. Such "self trading" detection may be implemented in accordance with business and/or regulatory rules implemented by the electronic trading system 100. It will be appreciated that the, in one alternative embodiment, the match engine 106 may attempt to identify suitable counter orders from other traders so as to complete the transactions, if possible, for all of the participants.

FIG. 3 depicts a block diagram of a match engine module 106 according to one embodiment, which in an exemplary implementation, is implemented as part of the exchange computer system 100 described above. As used herein, an electronic trading system 100, i.e., exchange, includes a place or system that receives and/or executes orders. It will be appreciated that the disclosed embodiments may be implemented by or in conjunction with other modules or components of the electronic trading. While the disclosed embodiments will be described with respect to a separate implementation for each match engine, market or order book, it will be appreciated that the disclosed embodiments may also be implemented across the entire electronic trading system 100 such as for example, by further denoting incoming orders by their intended market and separately processing orders received for a given market as described herein.

In particular, FIG. 3 depicts a block diagram of a system 300, which may also be referred to as an architecture, for determining, by an electronic trading system 100, an allocation of an incoming order for a transaction of a quantity of a financial instrument at an order price among a plurality of previously received but unsatisfied orders, stored in a first memory 110, e.g. a match engine memory 110 or order book memory/database 110, for a transaction counter thereto at the order price for a total quantity of the financial instrument that is less than the quantity of the incoming order, wherein each of the plurality of previously received but unsatisfied orders is characterized by a time of receipt at which the previously received but unsatisfied order was received by the electronic trading system 100, such as incoming orders to trade a financial product, received via a network, such as the network 126 of FIG. 1, from a plurality of market participants. Wherein, as described, the electronic trading system 100 comprising a match engine 106 which implements a market for an associated financial instrument by being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order.

The system 300 includes an match engine order receiver 306, which may be implemented as a separate component or as one or more logic components, such as on an FPGA which may include a memory or reconfigurable component to store logic and processing component to execute the stored logic, or as first logic 306, e.g. computer program logic, stored in a memory 304, or other non-transitory computer readable medium, and executable by a processor 302, such as the processor 402 and memory 404 described below with respect to FIG. 4, to cause the processor 302 to, or otherwise be operative to, receive the incoming order.

The system 300 further includes an order monitor 308, coupled with the match engine memory 110, which may be implemented as a separate component or as one or more logic components, such as on an FPGA which may include a memory or reconfigurable component to store logic and processing component to execute the stored logic, or as second logic 308, e.g. computer program logic, stored in a memory 304, or other non-transitory computer readable medium, and executable by a processor 302, such as the processor 402 and memory 404 described below with respect to FIG. 4, to cause the processor 302 to, or otherwise be operative to, determine an elapse of time and based on the magnitude thereof, divide the plurality of previously received but unsatisfied orders into at least one non-overlapping subset thereof, each comprising at least one of the plurality of previously received but unsatisfied orders, as a function of the time of receipt thereof.

The system 300 further includes an order allocator 310, coupled with the match engine memory 110, the match engine order receiver 306 and the order monitor 308, and which may be implemented as a separate component or as one or more logic components, such as on an FPGA which may include a memory or reconfigurable component to store logic and processing component to execute the stored logic, or as third logic 308, e.g. computer program logic, stored in a memory 304, or other non-transitory computer readable medium, and executable by a processor 302, such as the processor 402 and memory 404 described below with respect to FIG. 4, to cause the processor 302 to, or otherwise be operative to, allocate the quantity of the incoming order to each of the at least one subset of previously received but unsatisfied orders according to a first allocation algorithm and subsequently thereto, allocate the quantity allocated to each subset of previously received but unsatisfied orders among the previously received but unsatisfied orders thereof according to a second allocation algorithm different from the first allocation algorithm.

Generally, the disclosed embodiments directed to allocation of an incoming order among resting orders apply to a resting order book and implement a decay function which may lower, relative to an entirely time-priority/FIFO based allocation, the benefit of being first to place an order, e.g., being first at a price level, as the order and/or the price level ages on the order book without being matched. As opposed to the hybrid allocation methodologies discussed above which either fix the application of a set of allocation methods or switch among methodologies based on the occurrence of particular conditions, the disclosed embodiments' reliance on the passage of time results in a more graceful transition among allocation methodologies as well as permits a more direct targeting of specific orders and price levels for controlling allocation thereto over time, e.g. may allow for an early order to maintains priority over a much later order as opposed to a more proximately received order. As resting orders and/or a price level ages, the resting orders may be clustered/grouped together, such as by temporal proximity, up to a threshold limit or until all orders are grouped together in a single grouping. When a suitably matching incoming order is received, it is first allocated across the order groups according to a first allocation algorithm, e.g., FIFO, and then the quantity allocated to each group is reallocated to the orders of that group according to a second allocation algorithm, e.g., pro rata. As will be understood, if an incoming order matching order is received soon after a resting order was received, the resting order may still have time priority and will be matched first, despite the subsequent receipt of other suitable resting orders. However, as time passes without a suitable incoming order having been received, the resting order will gradually be grouped with other suitable resting orders, the degree of grouping increasing over time, such that when the suitable incoming order is finally receiving, the earliest received resting order may have to share that incoming order pro rata with other later received resting orders. Traders who place their orders first cannot lock up the order book due to their time priority and traders who seek pro rata allocation may be exposed to a FIFO allocation initially, tempering their willingness to inflate their order quantity or otherwise "top off" their orders by increasing their quantity after a small partial fill occurs (since doing so, in at least one embodiment herein, will deprecate their priority).

As incoming order allocation is really only an issue when the incoming order quantity, or residual quantity after first satisfying a better price level, is less than the total quantity of the resting orders at a given matching price level, the disclosed embodiments will be discussed specifically with reference to the situation of an incoming order having a quantity less than the total quantity resting at a given price level. It will be appreciated that the disclosed embodiments may be utilized when the incoming quantity is greater than the total resting quantity, but the result will be the same, all orders will be filled. Furthermore, where the incoming order is first matched against a first price level which is fully satisfied thereby, leaving residual quantity for matching with a next better price level, the disclosed embodiments may be applicable thereto and it will be understood that reference herein the quantity of the incoming order may refer to the residual quantity after first satisfying one or more better price levels.

For example, orders resting on the order book for less than 10 ms may be treated as individual groups and, upon receipt of a suitable matching incoming order, be allocated on a time priority/FIFO basis. However, if a suitable incoming order is not received within 10 ms, the resting orders may be grouped such as by orders having been received within 2 ms of each other. However, more recently received resting orders, i.e., younger orders, remain ungrouped, albeit, based on the FIFO allocation, prioritized behind the groups of previously resting orders. After another 10 ms without a suitable incoming order, the resting orders, may be regrouped, such s based on orders being within 4 ms of each other, effectively collecting more orders within each group and thereby diminishing the time priority value of any one order therein. This may be a continuous process performed as an incoming order is received or based on some other event or the elapse of time. As resting orders are satisfied or canceled, the groups may be reevaluated based, for example, on the oldest order or on the age of the particular price level at which orders are resting.

Effectively, this provides time decay for a particular resting order from, for example, a FIFO allocation to a pro rata allocation, with both the initial FIFO benefit and the rate of decay to pro rata being fully configurable, such as market by market. By applying the disclosed decay process by price level, traders who better a price, i.e., are first to place an order at a particular price, get the benefit of FIFO allocation initially but the benefit decays reflecting the view that as time passes, one should not be rewarded as much for being first. The rate of decay may be tailored so as to:

Discourage traders from placing or modifying an order for more quantity than the trader really wants in order to secure a larger pro-rata portion. Modifications as to quantity may cost a trader their time priority position. The slower the decay, the greater the penalty for losing time priority which will then dis-incentivize traders to increase quantity as a price level fills;

Discourage traders from joining a pro-rata market late with a large size as, due to the time priority, they will be filled last;

Provide the benefit of FIFO to traders who place market-turning orders but discourage traders from stacking price levels at the beginning of the day (or other trading period) to secure early time priority position; or Automatically handle markets which move quickly at some times of the day, e.g. during daylight hours, and move slowly at other times, e.g. during overnight hours. During times of quick price movement, FIFO will be primarily used, however during times of slow price movement, pro rata will be more likely, benefiting, for example, traders willing to quote overnight.

In further implementations, the decay function and/or the grouping criteria may be altered based on external or internal triggers such as:

release of economic indicators, government reports or earnings reports, etc. Slowing the decay function around the release may incentivize order placement prior to the release because those orders would more likely receive a FIFO allocation; or based on time of day. Use the decay function to shift between a fully FIFO market (slow decay) and fully pro rata market (fast decay) as necessary.

While the disclosed system for prioritizing order allocation is discussed separately from the embodiments discussed above relate to incoming order regulation, it will be appreciated that they may be implemented separately or in conjunction with each other and all such implementations are contemplated herein. In combined implementations, the batching of incoming orders may be the basis for grouping those orders which get rested on the order book as time passes. It will be appreciated that where the batching is based on order arrival time, the grouping function may similarly rely on the order arrival time for grouping purposes without knowledge of the batching process based thereon.

Generally, the evaluation of the decay and the subsequent grouping of orders for allocation priority is performed just prior to the processing of a suitably matching incoming order. However, it will be appreciated that the decay evaluation and grouping may be performed at other times, such as subsequent to the processing of suitably matching incoming order.

In one embodiment, the quantity of the incoming order further comprises a residual quantity thereof remaining after fully satisfying one or more other previously received but unsatisfied orders for a transaction counter thereto at a price better than the order price for a total quantity of the financial instrument that is less than the quantity of the incoming order.

In one embodiment, the time of receipt of each of the plurality of previously received but unsatisfied orders comprises a time at which the electronic trading system determined the previously received order was unsatisfied.

In one embodiment, the order monitor 308 is operative to determine the elapse of time as the amount of time passed since an event has occurred. For example, in one embodiment, the order monitor 308 is operative to determine the elapse of time as the amount of time passed since the oldest of the plurality of previously received but unsatisfied orders was received by the electronic trading system. It will be appreciated that basing the decay on the oldest order may cause anomalous results when the oldest order is canceled or satisfied, e.g., where other resting orders may shift from pro-rata back to FIFO and some orders fail to be satisfied. It will be appreciated that the elapse of time may be determined based on other events such as a time of a most recent trade, etc.

Alternatively, in one embodiment, the order monitor 308 is operative to determine the elapse of time as the amount of time passed since a first previously received order for a transaction of a quantity of the financial instrument at the order price was determined to be unsatisfied when there were no other previously received but unsatisfied orders at the order price received prior thereto stored in the match engine memory. In particular, the elapse of time may be measured as the age of the price level, i.e., the amount of time since a first order was rested at the particular price level when there were previously no resting orders at that price level. In one embodiment, modification or cancelation of this first order, such as to alter its quantity, may not affect the determined price level age. Alternatively, such a modification or cancelation may cause the price level age to be determined based on the next later order at that price level. Alternatively, in one embodiment, the order monitor 308 is operative to determine the elapse of time as the amount of time passed since the first previously received order for a transaction of a quantity of the financial instrument at the order price in excess of a threshold quantity was determined to be unsatisfied when there were no other previously received but unsatisfied orders at the order price received prior thereto stored in the memory at all or which exceeded the threshold quantity. By defining the decay based on the age of each price level, satisfaction or cancellation of the oldest orders no longer affects the decay and grouping computation. In one embodiment, the first previously received order is no longer one of the plurality of previously received orders, e.g., because it was satisfied or canceled.

In one embodiment, the elapse of time resets upon satisfaction or cancelation of all of the plurality of previously received but unsatisfied orders. In one embodiment, the elapse of time resets upon occurrence of an event, e.g., at close of the market, interruption of trading, etc. In one embodiment, the elapse of time resets upon the total quantity of the plurality of previously received but unsatisfied orders decreases below a threshold quantity subsequent to allocation of the incoming order.

In one embodiment, the previously received but unsatisfied orders of a subset are all accorded a time of receipt by the electronic trading system associated with the oldest previously received but unsatisfied order of the subset for use by the order monitor after a subsequent determination of an elapse of time.

In one embodiment, the division of the plurality of previously received but unsatisfied orders into the at least one subset thereof is based on the time of receipt of each of the plurality of previously received but unsatisfied orders being within a threshold of the time of receipt of another of the plurality of previously received but unsatisfied orders, the magnitude of the threshold being a function of the magnitude of the determined elapse of time, wherein those previously received but unsatisfied orders having a time of receipt within the threshold of another of the plurality of previously received but unsatisfied orders are included in the same subset. This may be referred to as a "floating batch."

In one embodiment, the division of the plurality of previously received but unsatisfied orders is based on the time of receipt of thereof rounded up to a threshold time increment, the magnitude of the threshold time increment being a function of the magnitude of the determined elapse of time, wherein those previously received but unsatisfied orders having a rounded time of receipt within the same threshold time increment are included in the same subset. This may be referred to as a "fixed batch."

It will be appreciated that Fixed batches may be more predictable to the trader. If they know the book population time and their time they can know with assurance where their orders fit in. Floating batches may be less predictable since the groupings are based on a reference that could change over time, potentially very quickly as orders are cancelled. Both Fixed and Floating batches could have edge case side effects as will be understood. Fixed batches could cause odd side effects if not defined properly. Consider orders at 100, 700, 1050 ms. At time T1 the groups are 400 ms, And the grouping is A BC At time T2 the groups are 500 ms and the grouping is A B C. C loses priority as time passes without B joining the A group, which may be the opposite of the intended result. An example of a function that would not cause this is a doubling function—if the groups increase by doubling (400 to 800 rather than 400 to 500). This may be defined as a rule, which may be implemented by an alternative embodiment, that once two orders are combined in a priority group they should never be separated, their group can combine with other groups or add additional orders but they should never split. This may preserve the decay property.

In one embodiment, the division of the plurality of previously received but unsatisfied orders increasingly reduces differentiation of the plurality of previously received but unsatisfied orders by their time of receipt as the magnitude of the elapse of time increases. In one embodiment, as the magnitude of the elapse of time increases, the number of subsets of the plurality of previously received but unsatisfied orders decreases. In one embodiment, the reduction of differentiation increases continuously. In one embodiment, the reduction of differentiation increases incrementally.

In one embodiment, the first allocation algorithm comprises first in first out ("FIFO") and the second allocation algorithm comprises pro rata. In one embodiment, the first and second matching algorithms may each comprise a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof It will be appreciated that the change of the grouping criteria relative to the elapse of time may be incremental, such as by using a look up table which relates order/price level age, or groups thereof, to particular grouping criteria to be applied. Alternatively, grouping criteria may be a function of the elapse of time wherein the function factors in The time the price level has had non-zero quantity The time the price level has had quantity over a certain configurable amount The arrival time of all orders, specifically the oldest and newest orders The time since the last trade A fixed lookup table Time of day, response time of the match engine, and/or other factors; and/or combinations thereof.

In one embodiment, the grouping criteria may have a maximum upper bound such that no matter how much time passes, the resting orders will not be further grouped together. In this embodiment, for example, resting orders will never fully decay to an entirely pro rata allocation methodology. Alternatively, the grouping criteria may increasingly progress until all resting orders are grouped together resulting in an entirely pro rata allocation. In one embodiment, the grouping criteria may be constant, e.g., 1 ms interorder difference or 1 ms interval regardless of price level or oldest order age, such that FIFO is generally preserved except for closely spaced orders. In such an embodiment where the grouping criteria is larger, e.g., 10 seconds, pro rata allocation may be generally preserved except for orders which rest at a price level just prior to a trade event. It will be appreciated that the desired grouping criteria may depend on the characteristics of the particular market, e.g., volatility or frequency at which orders are received, and the intended goal, e.g., to favor FIFO over pro rata or vice versa, etc.

Figure 6:
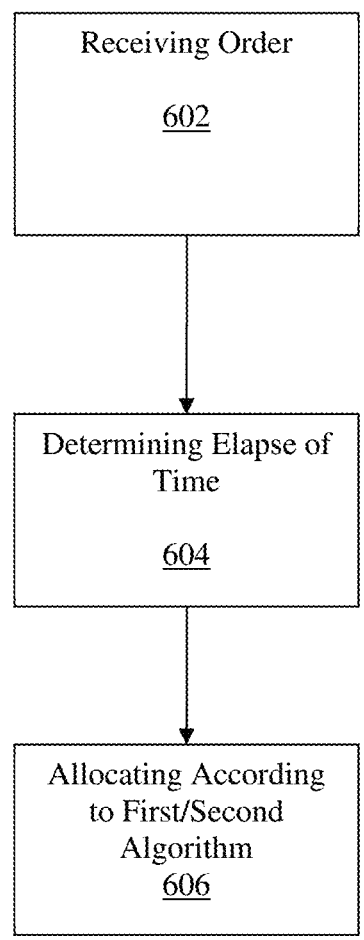
FIG. 6 depicts a flow chart showing operation of the system of FIGS. 1 and 3.

FIG. 6 depicts a flow chart showing operation of the system 300 of FIG. 3. In particular FIG. 6 shows a computer implemented method for determining, by an electronic trading system 100, an allocation of an incoming order for a transaction of a quantity of a financial instrument at an order price among a plurality of previously received but unsatisfied orders, stored in a match engine memory, for a transaction counter thereto at the order price for a total quantity of the financial instrument that is less than the quantity of the incoming order, wherein each of the plurality of previously received but unsatisfied orders is characterized by a time of receipt at which the previously received but unsatisfied order was received by the electronic trading system 100.

The operation of the system 300 includes: receiving, by a match engine processor, the incoming order [Block 602];

determining, by the match engine processor, an elapse of time and based on the magnitude thereof, dividing the plurality of previously received but unsatisfied orders into at least one non-overlapping subset thereof, each comprising at least one of the plurality of previously received but unsatisfied orders, as a function of the time of receipt thereof [Block 604]; and allocating, by the match engine processor, the quantity of the incoming order to each of the at least one subset of previously received but unsatisfied orders according to a first allocation algorithm and subsequently thereto, allocating the quantity allocated to each subset of previously received but unsatisfied orders among the previously received but unsatisfied orders thereof according to a second allocation algorithm different from the first allocation algorithm [Block 606].

Generally, the disclosed embodiments apply to a resting order book and implement a decay function which lowers the benefit of being first to place an order, e.g., being first at a price level, as the order and/or the price level ages on the order book without being matched. As opposed to the hybrid allocation methodologies discussed above which either fix the application of a set of allocation methods or switch among methodologies based on the occurrence of particular conditions, the disclosed embodiments' reliance on the passage of time results in a more graceful transition among allocation methodologies as well as permits a more direct targeting of specific orders and price levels for controlling allocation thereto over time, e.g. may allow for an early order to maintain priority over a much later order as opposed to a more proximately received order. As resting orders and/or a price level ages, the resting orders are clustered/grouped together, such as by temporal proximity. When a suitably matching incoming order is received, it is first allocated across the order groups according to a first allocation algorithm, e.g., FIFO, and then the quantity allocated to each group is reallocated to the orders of that group according to a second allocation algorithm, e.g., pro rata. As will be understood, if an incoming order matching order is received soon after a resting order was received, the resting order may still have time priority and will be matched first, despite the subsequent receipt of other suitable resting orders. However, as time passes without a suitable incoming order having been received, the resting order will gradually be grouped with other suitable resting orders, the degree of grouping increasing over time, such that when the suitable incoming order is finally receiving, the earliest received resting order may have to share that incoming order pro rata with other later received resting orders. Traders who place their orders first cannot lock up the order book due to their time priority and traders who seek pro rata allocation may be exposed to a FIFO allocation initially, tempering their willingness to inflate their order quantity.

As incoming order allocation is really only an issue when the incoming order quantity, or residual quantity after first satisfying a better price level, is less than the total quantity of the resting orders at a given matching price level, the disclosed embodiments will be discussed specifically with reference to the situation of an incoming order having a quantity less than the total quantity resting at a given price level. It will be appreciated that the disclosed embodiments may be utilized when the incoming quantity is greater than the total resting quantity, but the result will be the same, all orders will be filled. Furthermore, where the incoming order is first matched against a first price level which is fully satisfied thereby, leaving residual quantity for matching with a next better price level, the disclosed embodiments may be applicable thereto and it will be understood that reference herein the quantity of the incoming order may refer to the residual quantity after first satisfying one or more better price levels.

For example, orders resting on the order book for less than 10 ms may be treated as individual groups and, upon receipt of a suitable matching incoming order, be allocated on a time priority/FIFO basis. However, if a suitable incoming order is not received within 10 ms, the resting orders may be grouped such as by orders having been received within 2 ms of each other. However, more recently received resting orders, i.e., younger orders, remain ungrouped, albeit, based on the FIFO allocation, prioritized behind the groups of previously resting orders. After another 10 ms without a suitable incoming order, the resting orders, may be regrouped, such s based on orders being within 4 ms of each other, effectively collecting more orders within each group and thereby diminishing the time priority value of any one order therein. This may be a continuous process performed as an incoming order is received or based on some other event or the elapse of time. As resting orders are satisfied or canceled, the groups may be reevaluated based, for example, on the oldest order or on the age of the particular price level at which orders are resting.

Effectively, this provides time decay for a particular resting order from, for example, a FIFO allocation to a pro rata allocation, with both the initial FIFO benefit and the rate of decay to pro rata being fully configurable, such as market by market. By applying the disclosed decay process by price level, traders who better a price, i.e., are first to place an order at a particular price, get the benefit of FIFO allocation initially but the benefit decays reflecting the view that as time passes, one should not be rewarded as much for being first. The rate of decay may be tailored so as to:

Discourage traders from placing or modifying an order for more quantity than the trader really wants in order to secure a larger pro-rata portion. Modifications as to quantity may cost a trader their time priority position. The slower the decay, the greater the penalty for losing time priority which will then dis-incentivize traders to increase quantity as a price level fills;

Discourage traders from joining a pro-rata market late with a large size as, due to the time priority, they will be filled last;

Provide the benefit of FIFO to traders who place market-turning orders but discourage traders from stacking price levels at the beginning of the day (or other trading period) to secure early time priority position; or Automatically handle markets which move quickly at some times of the day, e.g. during daylight hours, and move slowly at other times, e.g. during overnight hours. During times of quick price movement, FIFO will be primarily used, however during times of slow price movement, pro rata will be more likely, benefiting, for example, traders willing to quote overnight.

In further implementations, the decay function and/or the grouping criteria may be altered based on external or internal triggers such as:

release of economic indicators, government reports or earnings reports, etc. Slowing the decay function around the release may incentivize order placement prior to the release because those orders would more likely receive a FIFO allocation; or based on time of day. Use the decay function to shift between a fully FIFO market (slow decay) and fully pro rata market (fast decay) as necessary.

While the disclosed system for prioritizing order allocation is discussed separately from the embodiments discussed above relate to incoming order regulation, it will be appreciated that they may be implemented separately or in conjunction with each other and all such implementations are contemplated herein. In combined implementations, the batching of incoming orders may be the basis for grouping those orders which get rested on the order book as time passes. It will be appreciated that where the batching is based on order arrival time, the grouping function may similarly rely on the order arrival time for grouping purposes without knowledge of the batching process based thereon.

Generally, the evaluation of the decay and the subsequent grouping of orders for allocation priority is performed just prior to the processing of a suitably matching incoming order. However, it will be appreciated that the decay evaluation and grouping may be performed at other times, such as subsequent to the processing of suitably matching incoming order.

In one embodiment, the quantity of the incoming order further comprises a residual quantity thereof remaining after fully satisfying one or more other previously received but unsatisfied orders for a transaction counter thereto at a price better than the order price for a total quantity of the financial instrument that is less than the quantity of the incoming order.

In one embodiment, the time of receipt of each of the plurality of previously received but unsatisfied orders comprise a time at which the electronic trading system determined the previously received order was unsatisfied.

In one embodiment, the determining further comprises determining the elapse of time as the amount of time passed since an event has occurred. For example, in one embodiment, the elapse of time is determined as the amount of time passed since the oldest of the plurality of previously received but unsatisfied orders was received by the electronic trading system. It will be appreciated that basing the decay on the oldest order may cause anomalous results when the oldest order is canceled or satisfied, e.g., where other resting orders may shift from pro-rata back to FIFO and some orders fail to be satisfied. It will be appreciated that the elapse of time may be determined based on other events such as a time of a most recent trade, etc.

In one embodiment, the elapse of time is determined as the amount of time passed since a first previously received order for a transaction of a quantity of the financial instrument at the order price was determined to be unsatisfied when there were no other previously received but unsatisfied orders at the order price received prior thereto stored in the memory. In particular, the elapse of time may be measured as the age of the price level, i.e., the amount of time since a first order was rested at the particular price level when there were previously no resting orders at that price level. In one embodiment, modification or cancelation of this first order, such as to alter its quantity, may not affect the determined price level age. Alternatively, such a modification or cancelation may cause the price level age to be determined based on the next later order at that price level. Alternatively, in one embodiment, the elapse of time is determined as the amount of time passed since the first previously received order for a transaction of a quantity of the financial instrument at the order price in excess of a threshold quantity was determined to be unsatisfied when there were no other previously received but unsatisfied orders at the order price received prior thereto stored in the memory at all or which exceeded the threshold quantity. By defining the decay based on the age of each price level, satisfaction or cancellation of the oldest orders no longer affects the decay and grouping computation. In one embodiment, the first previously received order is no longer one of the plurality of previously received orders, e.g., because it was satisfied or canceled.

In one embodiment, the elapse of time resets upon satisfaction or cancelation of all of the plurality of previously received but unsatisfied orders. In one embodiment, the elapse of time resets upon occurrence of an event, e.g., at close of the market, interruption of trading, etc. In one embodiment, the elapse of time resets upon the total quantity of the plurality of previously received but unsatisfied orders decreases below a threshold quantity subsequent to allocation of the incoming order.

In one embodiment, the previously received but unsatisfied orders of a subset are all accorded a time of receipt by the electronic trading system associated with the oldest previously received but unsatisfied order of the subset for use by the order monitor after a subsequent determination of an elapse of time.

In one embodiment, the division of the plurality of previously received but unsatisfied orders into the at least one subset thereof is based on the time of receipt of each of the plurality of previously received but unsatisfied orders being within a threshold of the time of receipt of another of the plurality of previously received but unsatisfied orders, the magnitude of the threshold being a function of the magnitude of the determined elapse of time, wherein those previously received but unsatisfied orders having a time of receipt within the threshold of another of the plurality of previously received but unsatisfied orders are included in the same subset. This may be referred to as a "floating batch."

In one embodiment, the division of the plurality of previously received but unsatisfied orders is based on the time of receipt of thereof rounded up to a threshold time increment, the magnitude of the threshold time increment being a function of the magnitude of the determined elapse of time, wherein those previously received but unsatisfied orders having a rounded time of receipt within the same threshold time increment are included in the same subset. This may be referred to as a "fixed batch."

It will be appreciated that Fixed batches may be more predictable to the trader. If they know the book population time and their time they can know with assurance where their orders fit in. Floating batches may be less predictable since the groupings are based on a reference that could change over time, potentially very quickly as orders are cancelled. Both Fixed and Floating batches could have edge case side effects as will be understood. Fixed batches could cause odd side effects if not defined properly. Consider orders at 100, 700, 1050 ms. At time T1 the groups are 400 ms, And the grouping is A BC At time T2 the groups are 500 ms and the grouping is A B C. C loses priority as time passes without B joining the A group, which may be the opposite of the intended result. An example of a function that would not cause this is a doubling function—if the groups increase by doubling (400 to 800 rather than 400 to 500). This may be defined as a rule, which may be implemented by an alternative embodiment, that once two orders are combined in a priority group they should never be separated; their group can combine with other groups or add additional orders but they should never split. This may preserve the decay property.

In one embodiment, the division of the plurality of previously received but unsatisfied orders increasingly reduces differentiation of the plurality of previously received but unsatisfied orders by their time of receipt as the magnitude of the elapse of time increases. In one embodiment, as the magnitude of the elapse of time increases, the number of subsets of the plurality of previously received but unsatisfied orders decreases. In one embodiment, the reduction of differentiation increases continuously. In one embodiment, the reduction of differentiation increases incrementally.

In one embodiment, the first allocation algorithm comprises first in first out ("FIFO") and the second allocation algorithm comprises pro rata. In one embodiment, the first and second matching algorithms may each comprise a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof It will be appreciated that the change of the grouping criteria relative to the elapse of time may be incremental, such as by using a look up table which relates order/price level age, or groups thereof, to particular grouping criteria to be applied. Alternatively, grouping criteria may be a function of the elapse of time wherein the function factors in The time the price level has had non-zero quantity
The time the price level has had quantity over a certain configurable amount
The arrival time of all orders, specifically the oldest and newest orders
The time since the last trade
A fixed lookup table
Time of day, response time of the match engine, and/or other factors; and/or
combinations thereof.

In one embodiment, the grouping criteria may have a maximum upper bound such that no matter how much time passes, the resting orders will not be further grouped together. In this embodiment, for example, resting orders will never fully decay to an entirely pro rata allocation methodology. Alternatively, the grouping criteria may increasingly progress until all resting orders are grouped together resulting in an entirely pro rata allocation. In one embodiment, the grouping criteria may be constant, e.g., 1 ms, such that FIFO is generally preserved except for closely spaced orders.

FIGS. 7A-C show exemplary operation of the disclosed embodiments for prioritizing incoming order allocation to resting orders. FIG. 7A, in particular, shows how the resting orders group together based on the defined decay rule/grouping criteria depending on how long it takes for incoming order X to be received, i.e., at T+1, T+2, T+3 or T+4. In this example, grouping is based on the oldest resting order. FIG. 7B shows an example operation of the disclosed embodiments considering the case of the oldest order being filled and the grouping criteria then changing based on the next oldest order, which may be similar to the scenario where the oldest order was instead canceled, i.e., that the oldest order was removed from the resting book. In this example, the allocation of the incoming order is demonstrated as a function of when it was received, i.e., at T+1, T+2, T+3 or T+4. The case of T+1 seconds is effectively FIFO, as in the example of FIG. 7A. At T+2 seconds, the initial grouping of [A B] is fully filled. The new "oldest resting order" is C, which is 1400 ms old. By the rule in the lookup table, we group orders by 250 milliseconds, which puts C and D in the same group. Quantity is assigned pro-rata, with D getting 133 rounded up. At T+3 seconds, the initial grouping becomes [A B C]. The quantity of the incoming order is not enough to fully satisfy, so no second round is done.

From the perspective of the trader of order D this result may seem anomalous, that the same trade that happens a second apart shuts them out—it doesn't decay smoothly from FIFO to pro-rata. It does start at FIFO and end at pro-rata, but there is a possible disconnect in the middle where the order goes from getting filled to not getting filled and then back.

FIG. 7C shows an example using the "time the price level had more than zero quantity" as the peg time rather than the time of the oldest resting order. In particular, once a trader creates the price level by putting an order on it, that time is kept as the oldest time for the price level until the price level is fully eliminated, which could happen either by order cancellation, trading out, or market close. This effectively shifts the algorithm to pro-rata in markets that have slow price movement. As an alternative, the mechanism could be based on the time the price level went above a defined/configurable quantity which would prevent someone from putting a 1 lot out on a market early just to force it to be pro-rata when they finally wanted to trade. As will be seen in the example of FIG. 7C, In this case four algorithms are being compared at a single point in time (T+1 seconds). There are two immediately consecutive arriving orders, one for 500 and one for 100. That results in two distinct allocations (the columns), resulting in a total allocation for each resting order (The total allocation column). There's also a column called "Single order?", which shows the allocation if a single 600 lot order came in instead of a 500 lot immediately followed by a 100 lot.

It can be seen that when pegged to the oldest order, the resulting allocation is different when 600 quantity arrives as (500,100) rather than (600). This may be undesirable, as it may lessen the predictability of the market.

This happens because when the decay tied to the oldest order, the removal of orders A, B from the book (in this case via trade) moves the batch from 500 ms down to 10 ms. That re-splits orders C, D into different batches, regardless of which, fixed or floating approach is taken to batching. By pegging to the inception time of the price level this effect is removed and more consistent behavior is achieved. If at any point the quantity on the price level goes from zero to non-zero quantity (or from below the threshold to above the threshold, if configured that way), a new inception value is set. This would likely be communicated to the marketplace either via explicit message, or via implicit rule by the timestamp when the market data book shows a certain quantity.

FIG. 7D shows exemplary variations of the operation of the disclosed embodiments as compared with singular allocation methods, i.e., all FIFO or all pro rata, and compared with a non-temporal hybrid methodology.

Referring to FIG. 4, an illustrative embodiment of a general computer system 400 is shown. The computer system 400 can include a set of instructions that can be executed to cause the computer system 400 to perform any one or more of the methods or computer-based functions disclosed herein. The computer system 400 may operate as a standalone device or may be connected, e.g., using a network, to other computer systems or peripheral devices. Any of the components or modules discussed above, such as the processors 202 and 302, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g., software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
a match engine processor of an electronic trading system, the match engine processor characterized by an available processing resource capacity;
a first processor coupled with the match engine processor, the first processor being configured to regulate an incoming flow of incoming orders for processing thereof relative to the available processing resource capacity of the match engine processor and being operative to:
receive an incoming order for a transaction for an associated financial instrument from a client computer of a user;
determine whether the incoming order is characterized by any of a set of order types;
when the first processor has determined that the incoming order is characterized by any of the set of order types, automatically forward the incoming order to the match engine processor;
when the first processor has determined that the incoming order is not characterized by any of the set of order types, determine whether an event has occurred, wherein the event comprises receipt of a feedback signal indicative of the available processing resource capacity of the match engine processor;

when the first processor has determined that the incoming order is not be characterized by any of the set of order types and that the event has not occurred, the first processor being further operative to:
- forward the received incoming order to a first buffer stored in a non-transitory memory coupled with the first processor; and
- store the received incoming order in the first buffer; and when the first processor has determined that the incoming order is not characterized by any of the set of order types and that the event has occurred, the first processor being further operative to:
- create a second buffer in the non-transitory memory;
- store the incoming order in the second buffer; and
- automatically forward at least a subset of previously received incoming orders stored in the first buffer to the match engine processor.

2. The system of claim 1, wherein the event further comprises one of an elapse of an interval of time, receipt of an acknowledgement from the match engine processor acknowledging receipt of previously forwarded incoming orders, or where a number of stored received incoming orders exceeds a threshold.

3. The system of claim 1, wherein the first processor is further operative to allow a subsequently received incoming order to modify or cancel a stored received incoming order prior to a forwarding thereof to the match engine processor.

4. The system of claim 1, wherein the match engine processor is operative to attempt to match the incoming order with at least one other previously received but unsatisfied order for a transaction counter thereto for the associated financial instrument, to at least partially satisfy one or both of the incoming order or the at least one other previously received order.

5. The system of claim 4, wherein, when the first processor has determined that the incoming order is not characterized by any of the set of order types and that the event has not occurred, the first processor is further operative to:
- aggregate the received incoming order with previously received incoming orders stored in the first buffer; and
- store the aggregated incoming orders in the first buffer in association with data indicative of time and/or order of receipt by the first processor in an order based on when they were received.

6. The system of claim 5, wherein the match engine processor is further operative to determine a sequence in which the match engine processor will attempt to match each of the forwarded subset of the received incoming orders, wherein the sequence is different than the order in which the aggregated incoming orders were stored in the first buffer.

7. The system of claim 1, wherein the first processor is further operative to receive the incoming order when an arrival of the incoming order relative to another incoming order has been determined.

8. The system of claim 1, wherein the first processor is comprised by the match engine processor.

9. The system of claim 1, wherein the feedback signal is further indicative of an elapse of an interval of time determined by a clock edge and wherein the interval of time begins to elapse upon receipt of an incoming order subsequent to a prior elapse of the interval of time.

10. The system of claim 9, wherein a duration of the interval of time is variable.

11. The system of claim 9, wherein a duration of the interval of time is at least partially random.

12. A computer implemented method comprising:
regulating, by a first processor from a client computer of a user, an incoming flow of incoming orders for processing thereof relative to an available processing resource capacity of a match engine processor, the regulating further comprising:
receiving, by the first processor, an incoming order for a transaction for an associated financial instrument;
determining, by the first processor, whether the incoming order is characterized by any of a set of order types;
when the first processor has determined that the incoming order is characterized by any of the set of order types, automatically forwarding, by the first processor, the incoming order to the match engine processor of an electronic trading system;
when the first processor has determined that the incoming order is not characterized by any of the set of order types, determining, by the first processor, whether an event has occurred, wherein the event comprises receipt of a feedback signal indicative of the available processing resource capacity of the match engine processor;
when the first processor has determined that the incoming order is not characterized by any of the set of order types and that the event has not occurred, the computer implemented method further comprising:
- forwarding, by the first processor, the received incoming order to a first buffer stored in a non-transitory memory;
- storing, by the first processor, the incoming order in the first buffer; and when the first processor has determined that the incoming order is not characterized by any of the set of order types and that the event has occurred, the computer implemented method further comprising:
- creating, by the first processor, a second buffer in the non-transitory memory; and
- storing, by the first processor, the incoming order in the second buffer; and
- forwarding, automatically by the first processor, at least a subset of previously received incoming orders stored in the first buffer to the match engine processor.

13. The computer implemented method of claim 12, wherein the event further comprises one of an elapse of an interval of time, receipt of an acknowledgement from the match engine processor acknowledging receipt of previously forwarded incoming orders, or where a number of stored received incoming orders exceeds a threshold.

14. The computer implemented method of claim 12, further comprising allowing, by the first processor, a subsequently received incoming order to modify or cancel a stored received incoming order prior to a forwarding thereof to the match engine processor.

15. The computer implemented method of claim 12, wherein the match engine processor is operative to attempt to match the incoming order with at least one other previously received but unsatisfied order for a transaction counter thereto for the associated financial instrument, to at least partially satisfy one or both of the incoming order or the at least one other previously received order.

16. The computer implemented method of claim 15, further comprising, when the first processor has determined that the incoming order is not be characterized by any of the set of order types and that the event has not occurred:

aggregating, by the first processor, the received incoming order with previously received incoming orders stored in the first buffer; and storing, by the first processor, the aggregated incoming orders in the first buffer in association with data indicative of time and/or order of receipt by the first processor in an order based on when they were received.

17. The computer implemented method of claim 16, further comprising determining, by the match engine processor, a sequence in which the match engine processor will attempt to match each of the forwarded subset of the received incoming orders, wherein the sequence is different from the order in which the aggregated incoming orders were stored in the first buffer.

18. The computer implemented method of claim 12, further comprising receiving, by the first processor, the incoming order when an arrival of the incoming order relative to another incoming order has been determined.

19. The computer implemented method of claim 12, wherein the determining, receiving, and forwarding are performed by the match engine processor.

20. The computer implemented method of claim 12, wherein the feedback signal is further indicative of an elapse of an interval of time determined by a clock edge and wherein the interval of time begins to elapse upon receipt of an incoming order subsequent to a prior elapse of the interval of time.

21. The computer implemented method of claim 20, wherein a duration of the interval of time is variable.

22. The computer implemented method of claim 20, wherein a duration of the interval of time is at least partially random.

23. A computer system comprising:
means for regulating an incoming flow of incoming orders for processing thereof relative to an available processing resource capacity of a match engine processor of an electronic trading system, the computer system further comprising:
means for receiving, from a client computer of a user, an incoming order for a transaction for an associated financial instrument;
means for determining whether the incoming order is characterized by any of a set of order types;
means for automatically forwarding, when the incoming order is characterized by any of the set of order types, the incoming order to the match engine processor,
means for determining, when the incoming order is not characterized by any of the set of order types, whether an event has occurred, wherein the event comprises receipt of a feedback signal indicative of the available processing resource capacity of the match engine processor;
when the incoming order is not characterized by any of the set of order types and that the event has not occurred, the computer system further comprising:
means for forwarding, the received incoming order to a first buffer stored in a non-transitory memory; and
means for storing, the incoming order in the first buffer;
when the incoming order is not characterized by any of the set of order types and the event has occurred, the computer system further comprising:
means for creating, a second buffer in the non-transitory memory; and
means for storing, the incoming order in the second buffer; and
means for automatically forwarding, at least a subset of previously received incoming orders stored in the first buffer to the match engine processor.

24. The computer system of claim 23, wherein the event further comprises one of an elapse of an interval of time, receipt of an acknowledgement from the match engine processor acknowledging receipt of previously forwarded incoming orders, or where a number of stored received incoming orders exceeds a threshold.

25. The computer system of claim 23, further comprising, when the incoming order is not characterized by any of the set of order types and the event has not occurred:
means for aggregating, the received incoming order with previously received incoming orders stored in the first buffer; and
means for storing the aggregated incoming orders in the first buffer in association with data indicative of time and/or order of receipt in an order based on when they were received.

26. The computer system of claim 25, wherein the match engine processor is further operative to determine a sequence in which the match engine processor will attempt to match each of the forwarded subset of the received incoming orders, wherein the sequence is different than the order in which the aggregated incoming orders were stored in the first buffer.

* * * * *